US008511009B2

(12) United States Patent
Kobayashi et al.

(10) Patent No.: US 8,511,009 B2
(45) Date of Patent: Aug. 20, 2013

(54) SECURING CONFIGURATION OF SOLAR CELL MODULE

(75) Inventors: Shuichi Kobayashi, Takahama (JP); Koji Okada, Takahama (JP); Takayoshi Yamanaka, Takahama (JP)

(73) Assignee: Yanegijutsukenkyujo Co., Ltd., Takahama-shi, Aichi (JP)

( * ) Notice: Subject to any disclaimer, the term of this patent is extended or adjusted under 35 U.S.C. 154(b) by 0 days.

(21) Appl. No.: 13/268,265

(22) Filed: Oct. 7, 2011

(65) Prior Publication Data

US 2012/0073220 A1    Mar. 29, 2012

Related U.S. Application Data

(63) Continuation of application No. PCT/JP2009/071526, filed on Dec. 25, 2009.

(30) Foreign Application Priority Data

May 11, 2009    (JP) ................................. 2009-114123

(51) Int. Cl.
E04D 13/18    (2006.01)
E04H 14/00    (2006.01)

(52) U.S. Cl.
USPC ............................................. 52/173.3; 52/710

(58) Field of Classification Search
USPC ...................................... 52/173.3, 710, 302.1
See application file for complete search history.

(56) References Cited

U.S. PATENT DOCUMENTS

| 7,758,011 B2 * | 7/2010 | Haddock | 248/500 |
| 7,915,519 B2 * | 3/2011 | Kobayashi | 136/251 |
| 2010/0269430 A1 * | 10/2010 | Haddock | 52/173.3 |
| 2011/0047903 A1 * | 3/2011 | Kobayashi | 52/173.3 |
| 2011/0239554 A1 * | 10/2011 | Tsuzuki et al. | 52/173.3 |
| 2011/0297808 A1 * | 12/2011 | Yamanaka et al. | 248/237 |

FOREIGN PATENT DOCUMENTS

| JP | 54-125479 U |   | 9/1979 |
| JP | 10-068203 A |   | 3/1998 |
| JP | 10068203 A | * | 3/1998 |
| JP | 2000-220268 A |   | 8/2000 |
| JP | 2000220268 A | * | 8/2000 |

(Continued)

OTHER PUBLICATIONS

Machine translation of JP 2001107518 A.*

(Continued)

*Primary Examiner* — Brian Glessner
*Assistant Examiner* — Paola Agudelo
(74) *Attorney, Agent, or Firm* — Westerman, Hattori, Daniels & Adrian, LLP

(57) ABSTRACT

A securing configuration of a solar cell module includes a plurality of supporting members which are mounted on roof members; a plurality of crosspiece members each of which is inserted between and supported by the supporting pieces of the plurality of supporting members, has first holding portions which hold first fastener members in a slidable manner on both side faces and a second holding portion which holds a second fastener member in a slidable manner on an upper face, and which are arranged at a predetermined interval in the roof lateral direction; and securing members which secure the solar cell module installed on the plurality of crosspiece members such that long sides of the solar cell module are intersected with the plurality of crosspiece members to the crosspiece members through the second fastener members held by the second holding portions.

5 Claims, 11 Drawing Sheets

(56) References Cited

FOREIGN PATENT DOCUMENTS

| | | | |
|---|---|---|---|
| JP | 2001-107518 A | | 4/2001 |
| JP | 2001107518 A | * | 4/2001 |
| JP | 2006-037545 A | | 2/2006 |
| JP | 2006-144266 A | | 6/2006 |
| JP | 2007-266446 A | | 10/2007 |

OTHER PUBLICATIONS

International Search Report of PCT/JP2009/071526, mailing date Mar. 9, 2010.

* cited by examiner

SECURING CONFIGURATION OF SOLAR CELL MODULE

This application is a continuation of International Application No. PCT/JP2009/071526 filed on Dec. 25, 2009 claiming priority upon Japanese Patent Application No. 2009-114123 filed May 11, 2009, of which full contents are incorporated herein by reference.

BACKGROUND OF THE INVENTION

Field of the Invention

The present invention relates to a securing configuration of a solar cell module which is installed on roof members.

Conventionally, a securing configuration of a solar cell module which is installed on roof members is as follows. That is, a plurality of long vertical crosspieces extending in a roof inclination direction (flow direction) are secured to the upper side of roof tiles, a slate, or the like through predetermined supporting clasps at a predetermined interval. Then, a plurality of long lateral crosspieces extending in a direction (lateral direction) perpendicular to the roof inclination direction are secured to these vertical crosspieces at an interval in accordance with a size of the solar cell module. In such a manner, a mounting mount in the form of parallel crosses is formed. Sides of the solar cell module in the lateral direction are installed on the lateral crosspieces of the mounting mount so that the solar cell module is secured (see, Japanese Patent Application Laid-open Nos. 2006-037545, 2006-144266 and 2007-266446).

However, in the conventional securing configuration of the solar cell module, each of sides of the solar cell module at the eaves side and the ridge side in the lateral direction is installed on the lateral crosspiece. Therefore, the lateral crosspieces are required to be mounted on the vertical crosspieces at an interval in accordance with the size of the solar cell module with high accuracy. Accordingly, a problem that a troublesome work is required to install the mounting mount and an operation cost is increased has arisen. In addition, there has arisen a problem that a work period is extended. Further, in the conventional technique, the mounting mount is formed in the form of parallel crosses. Therefore, there has been a problem that a large number of crosspiece members are required and the number of parts is increased so as to increase cost of members.

It can be considered that the mounting mount for mounting the solar cell module is formed only by crosspiece members of either of the vertical crosspieces or the lateral crosspieces without forming the mounting mount in the form of parallel crosses. However, even in this case, the crosspiece members are required to be mounted at an interval in accordance with the size of the solar cell module such that sides of the solar cell module, which extend in the same direction as the direction in which the crosspiece members extend, are installed on the crosspiece members. Therefore, a troublesome work is required to install the crosspiece members. In addition, when supporting clasps for supporting the crosspiece members are mounted on supporting tiles as the roof members, if the size of the solar cell module does not correspond to a laying pitch of the roof tiles, the crosspiece members cannot be supported at an interval in accordance with the size of the solar cell module. This causes a problem that the solar cell module cannot be installed on the roof member.

SUMMARY OF THE INVENTION

In view of the above circumstances, an object of the present invention is to provide a securing configuration of a solar cell module, which makes it possible to reduce cost required for installing the solar cell module.

In order to achieve the above object, a securing configuration of a solar cell module according to an aspect of the invention "includes a plurality of supporting members which have pairs of plate-like supporting pieces projecting to the upper side and are mounted on roof members at a predetermined interval such that a direction in which the supporting pieces are opposed to each other faces to a predetermined direction; a plurality of crosspiece members each of which is inserted between the pairs of supporting pieces of the supporting members, is supported by the plurality of supporting members, has at least first holding portions which hold first fastener members in a slidable manner only in a lengthwise direction on both side faces and a second holding portion which holds a second fastener member in a slidable manner only in the lengthwise direction on an upper face, and is secured to and supported by the supporting members by fastening the first fastener members held by the first holding portions and to-be first fastener members fastened to the first fastener members so as to penetrate through the supporting pieces of the supporting members, and which are arranged on roof members at a predetermined interval in a direction perpendicular to the lengthwise direction; and securing members which secure the solar cell module installed on each of the upper faces of the plurality of crosspiece members such that two sides of the solar cell module, which are opposed to each other, are intersected with the plurality of crosspiece members to the crosspiece members through the second fastener members held by the second holding portions of the crosspiece members."

As the "supporting member", "a supporting member which is mounted on a supporting roof member (for example, supporting roof tile) which has a mounting portion on a roof tile, a slate or the like as the roof member so as to be mounted on the roof member through the mounting portion", "a supporting member of which base end side is secured to a constituent member of roof such as a roofboard on which a roof member is laid and front end side is mounted on the roof member through a predetermined base member exposed onto the roof member", and the like can be exemplified.

Further, as the "first fastener member and, to-be first fastener member", combinations of "a nut and a bolt", "a bolt and a nut", and the like can be exemplified. In addition, as the "second fastener member", "a nut", "a bolt", and the like can be exemplified.

According to the aspect of the invention, the solar cell module is secured to upper faces of the plurality of crosspiece members, which are supported on the roof members at a predetermined interval by the supporting members, by the securing members. Therefore, a mount is not required to be formed by assembling the crosspiece members in the form of parallel crosses unlike the conventional technique. Accordingly, the number of parts can be reduced so as to reduce the cost and installation man hours can be reduced.

Further, the solar cell module is installed on the plurality of crosspiece members such that two sides of the solar cell module, which are opposed to each other, intersect with the plurality of crosspiece members and the solar cell module is secured to the crosspiece members by the securing members at the intersections. Therefore, if the plurality of crosspiece members are supported on the roof members at an interval shorter than the length of the sides of the solar cell module, which are to be secured, the solar cell module can be secured. Therefore, the crosspiece members are not required to be mounted at an interval in accordance with the size of the solar cell module unlike the conventional technique. Accordingly, a troublesome work required for mounting the crosspiece members can be simplified so that operation cost can be reduced and a work period can be shortened.

Further, the space between the crosspiece members is not required to correspond to the size of the solar cell module. Therefore, even if a laying pitch of the roof members such as roof tiles and the size of the solar cell module do not correspond to each other, the solar cell module can be installed on the roof with no problem.

Further, the solar cell module is arranged such that two sides of the solar cell module, which are opposed to each other, and the crosspiece members are intersected with each other, and the solar cell module is secured. In addition, the solar cell module is secured by the securing members through the second fastener members held by the second holding portions of the crosspiece members in a slidable manner. Therefore, the solar cell module installed on the crosspiece members can be secured regardless of an installation position and the size of the solar cell module by sliding the second fastener members (securing members). Accordingly, solar cell modules having various sizes can be employed and the degree of installation freedom of the solar cell module can be enhanced.

Further, the crosspiece members are inserted between the pairs of supporting pieces on the supporting members, and then, the side faces of the crosspiece members and the supporting pieces are fastened and secured through the first fastener members held by the first holding portions of the crosspiece members. Therefore, the crosspiece members can be secured tightly from both sides by the supporting members. Accordingly, even if a large load is applied to the solar cell module due to typhoon, strong wind, rainfall, snowfall, or the like, the solar cell module can be firmly secured. With this, reliability relating to installation of the solar cell module can be enhanced.

In the securing configuration of the solar cell module according to the aspect of the invention, in addition to the above configuration, "the securing members include spacer members which make contact with a side face of the solar cell module, are installed on the upper faces of the crosspiece members, have openings through which the to-be second fastener members fastened to the second fastener members or the second fastener members are capable of being inserted, and are formed to be lower than the solar cell module; and pressing force members which are arranged at the upper side of the spacer members and have openings through which the to-be second fastener members fastened to the second fastener members or the second fastener members are capable of being inserted and contact portions which are capable of making contact with an upper face of the solar cell module, and the to-be second fastener members are fastened to the second fastener members held by the second holding portions of the crosspiece members through the openings of the spacer portions and the openings of the pressing force members so that the solar cell module is pressurized against the crosspiece members by the pressing force members and secured to the crosspiece members."

According to the aspect of the invention, the spacer members make contact with the side face of the solar cell module so as to restrict the solar cell module from moving in the direction along the crosspiece members. Further, the pressing force members make contact with the upper face of the solar cell module so as to restrict the solar cell module from separating from the upper faces of the crosspiece members. In this manner, the securing members for securing the solar cell module to the crosspiece members can be realized.

When the solar cell modules are secured to the crosspiece members at the same time by one securing member arranged between the solar cell modules which are adjacent to each other, the solar cell modules are required to be previously installed on the crosspiece members at a constant interval in accordance with the size of the securing member. Therefore, a problem that a troublesome work is required to secure the solar cell modules. In comparison with this, in the invention, the side faces of the solar cell modules are made contact with both sides of the spacer member so that the solar cell modules can be easily arranged at a constant interval. If the upper faces of the solar cell modules are pressurized by the pressing force members in this state, the solar cell modules which are adjacent to each other can be secured at the same time. Therefore, the plurality of solar cell modules can be easily arranged and secured at a predetermined interval. Accordingly, a troublesome work relating to the installation of the solar cell modules can be simplified.

Further, in the securing configuration of the solar cell module according to the aspect of the invention, in addition to the above configuration, "the securing members are arranged between the crosspiece members and the spacer members, have projecting portions which get stuck in each of lower faces of the solar cell modules and the upper faces of the crosspiece members if the solar cell module is pressurized against the crosspiece members by the pressing force members, and further include earth members which are capable of electrically connecting between the solar cell modules arranged at both sides with respect to the spacer members and between the solar cell modules and the crosspiece members."

According to the aspect of the invention, if the earth members are interposed between the crosspiece members and the spacer members, and then, the solar cell modules which are arranged at both sides with respect to the spacer members are pressurized against the crosspiece members by the pressing force members, the projecting portions of the earth members get stuck in each of the lower faces of the solar cell modules and the upper faces of the crosspiece members. With this, the solar cell modules and the crosspiece members, and the solar cell modules are electrically connected to each other. Therefore, the solar cell modules can be easily earth-connected to each other only by securing the solar cell modules by the securing members. Accordingly, a troublesome work relating to the earth connection can be simplified.

Further, in the securing configuration of the solar cell module according to the aspect of the invention, in addition to the above configuration, "the crosspiece members further include guiding grooves which are recessed along the lengthwise direction on lower faces and are capable of guiding distributing cables connected to the solar cell module."

Meanwhile, if the distributing cables connected to the solar cell module are made to trail over the roof members, there arise risks that rainwater and the like flowing down the roof members stagnate due to the distributing cables so as to cause roof leak and the stagnated rainwater and the like are decomposed so as to cause strange odor, or the distributing cables which hit the roof members are grazed so as to cause electrical leakage. Then, it can be considered that in order to, solve the above problems, the distributing cables are made to run along the crosspiece members using banding bands or the like to prevent the distributing cables from dropping on the roof members. However, when the faces (for example, lower faces) of the crosspiece members along which the distributing cables are made to run are flat faces, there arise problems that the distributing cables are easy to move and an attachment operation of the banding bands or the like to the crosspiece members is difficult and the distributing cables are deviated after the attachment to the crosspiece members.

According to the aspect of the invention, recessed guiding grooves are provided on the lower faces of the crosspiece members. Therefore, if the distributing cables are inserted into the guiding grooves, the distributing cables can be easily made along the crosspiece members straightly and the distributing cables made along the crosspiece members can be made difficult to move. Accordingly, the distributing cables can be easily attached to the crosspiece members so as to be made along the crosspiece members using the banding bands or the like. Further, the distributing cables can be prevented from being deviated after the attachment. Therefore, the distributing cables can be attached to the crosspiece members with good appearance and the above problems can be solved.

It is to be noted that notch portions which prevent the distributing cables guided by the guiding grooves of the crosspiece members from making contact with the supporting members may be provided on the supporting members which support the crosspiece members. With this, the distributing cables can be wired with good appearance.

Further, in addition to the above configuration, the securing configuration of the solar cell module according to the aspect of the invention "further includes an anti-drop member which is secured to a lower face of the solar cell module and makes contact with the crosspiece member so as to prevent the solar cell module from dropping from the crosspiece member." Here, as the "anti-drop member", "a member of which cross section has a substantially inverted L shape", "a member including a function of pressurizing both side faces of the crosspiece members", "a member which makes contact with side faces which are opposed to each other or reversed to each other on two crosspiece members and has a function of pressurizing at least one side face", and the like can be exemplified.

According to the aspect of the invention, the anti-drop members are provided on the lower face of the solar cell module. Therefore, the anti-drop members make contact with the crosspiece members before the solar cell module is secured to the crosspiece members mounted on the inclined roof members by the securing members. Therefore, the anti-drop members make it possible to prevent the solar cell module from sliding and dropping along the crosspiece members. Accordingly, safety during the installing operation of the solar cell module can be improved and workability can be improved.

Meanwhile, when the crosspiece members are arranged so as to extend in the direction perpendicular to the roof inclination direction, the side of the solar cell module at the eaves side is inevitably located at a position projecting to the eaves side with respect to the crosspiece members. Therefore, for example, even if the side of the solar cell module at the eaves side is tried to be supported by the securing members which are temporarily secured to the crosspiece members in order to prevent the solar cell module from dropping, there arises a problem that the solar cell module before secured cannot be prevented from dropping by the securing members. However, according to the aspect of the invention, the anti-drop members are provided on the lower face of the solar cell module. Therefore, the anti-drop members make contact with the crosspiece members so as to prevent the solar cell module from sliding to the eaves side and dropping from the crosspiece members. Accordingly, the same action effects as those described above can be obtained.

Further, in the securing configuration of the solar cell module according to the aspect of the invention, in addition to the above configuration, "the crosspiece members are arranged so as to extend along a roof flow direction (roof inclination direction)."

According to the aspect of the invention, the solar cell module is secured to the crosspiece members arranged so as to extend along the roof flow direction (inclination direction). Therefore, if the securing members are previously mounted on the crosspiece members in the vicinity of ends thereof at the eaves side before the solar cell module is installed on the crosspiece members, the solar cell module on the crosspiece members can be prevented from sliding to the eaves side and dropping by the securing members. Accordingly, the solar cell module is not required to be continuously supported until the solar cell module is secured by the securing members. This makes it possible to easily perform a securing operation of the solar cell module so as to improve workability and reduce the cost required for the installation.

DETAILED DESCRIPTION OF THE PREFERRED EMBODIMENTS

Figure 1:
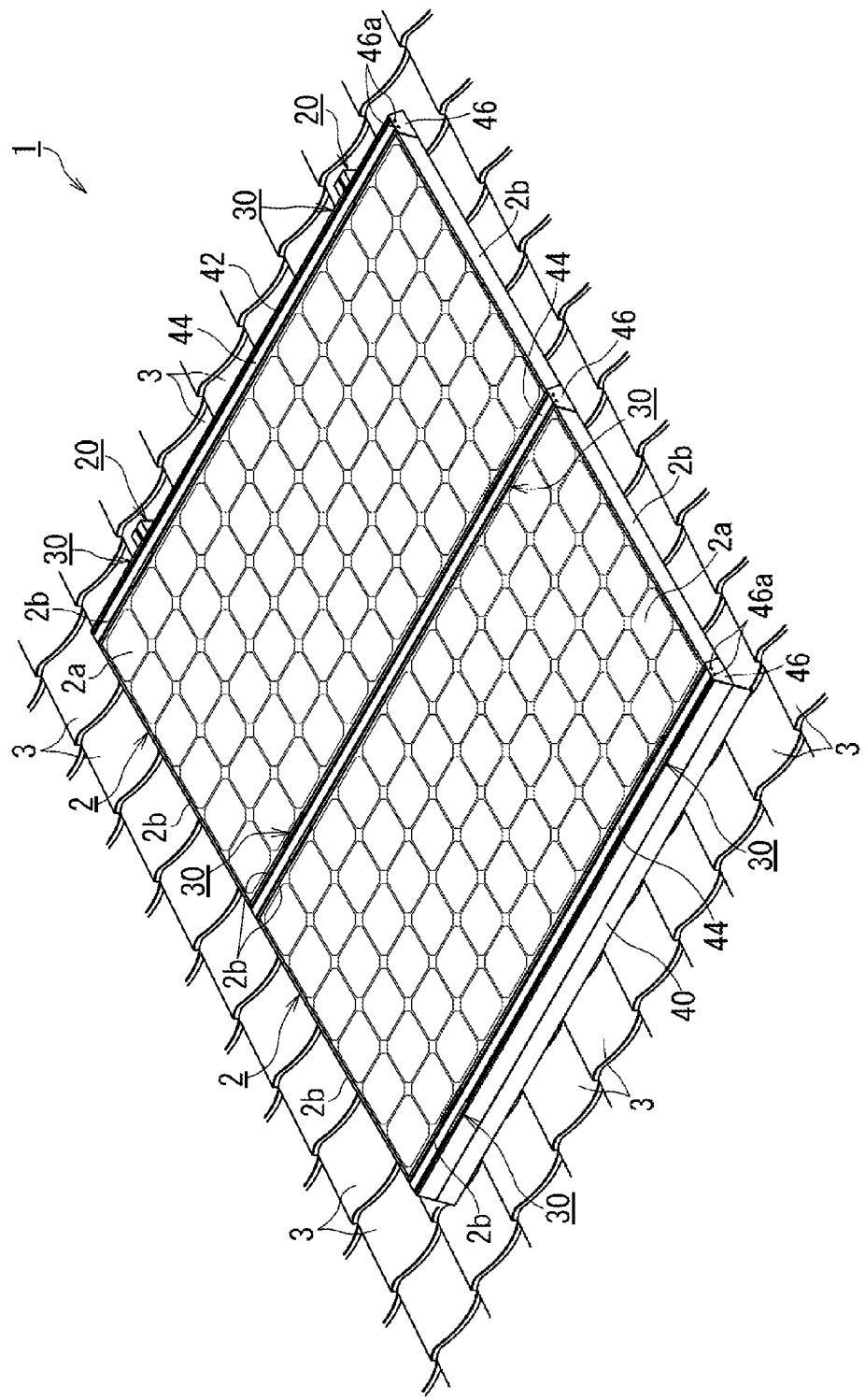
FIG. 1 is an entire perspective view illustrating a solar power generation system in which a securing configuration of a solar cell module according to one embodiment of the invention is applied.
Figure 2:
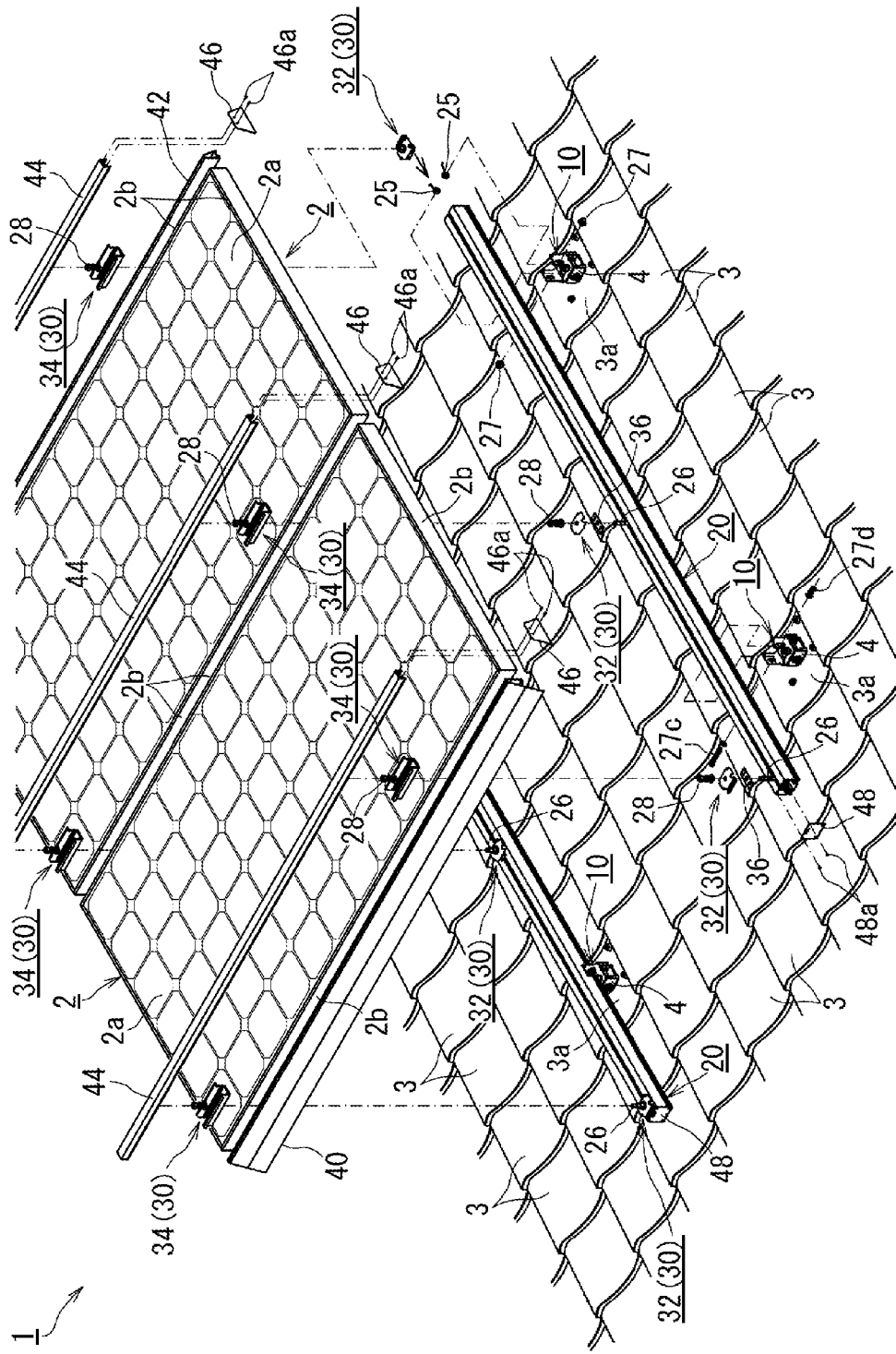
FIG. 2 is an exploded perspective view illustrating the solar power generation system of FIG. 1 in an exploded manner into each of constituent members.
Figure 3A:
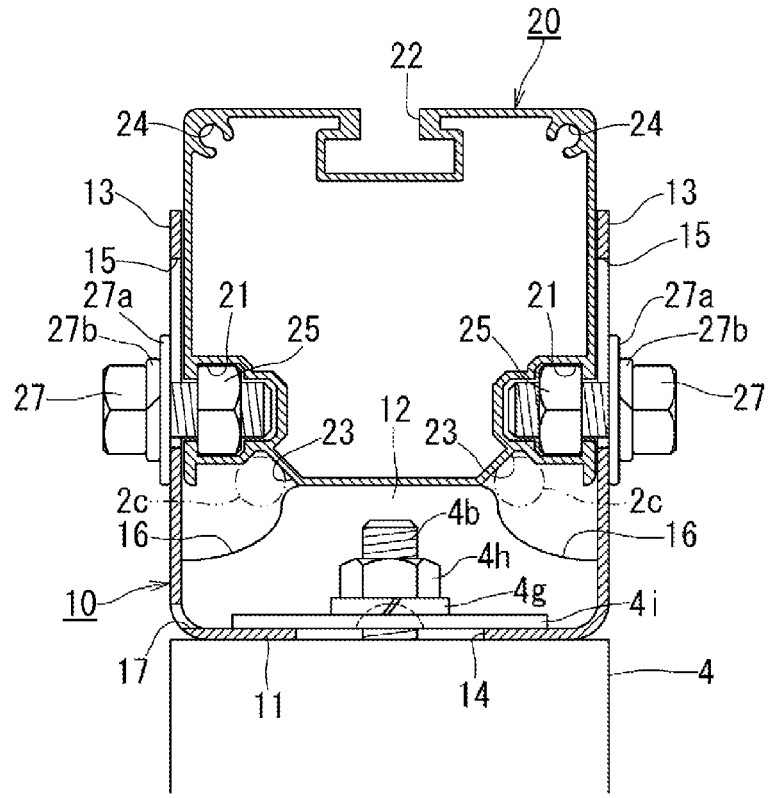
FIG. 3A is a cross-sectional view illustrating a mounting state of a supporting member and a crosspiece member.
Figure 3B:
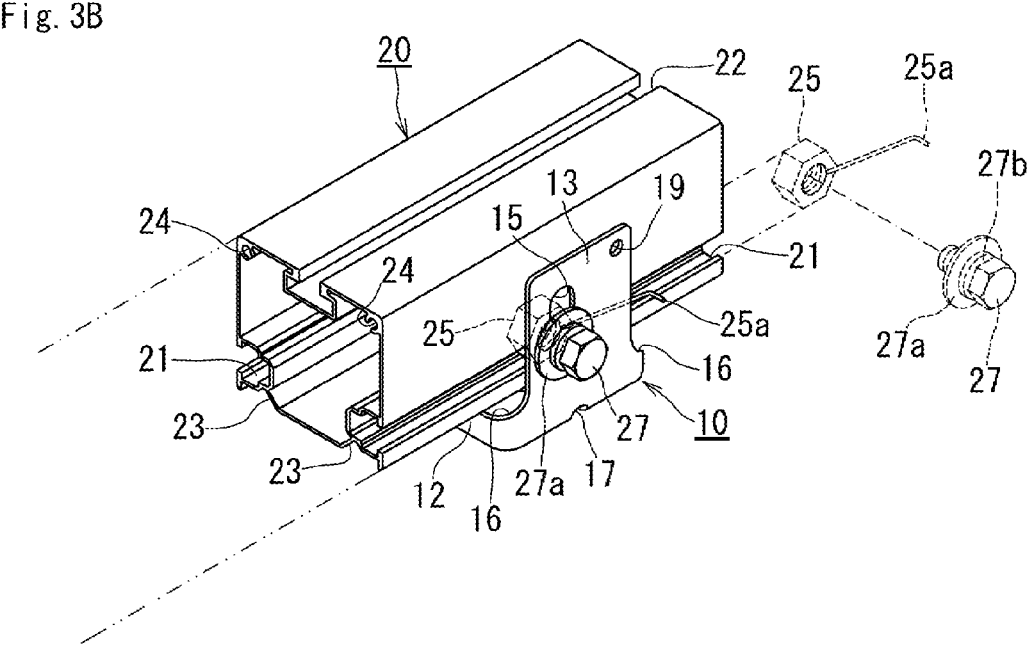
FIG. 3B is a perspective view of FIG. 3A.
Figure 4:
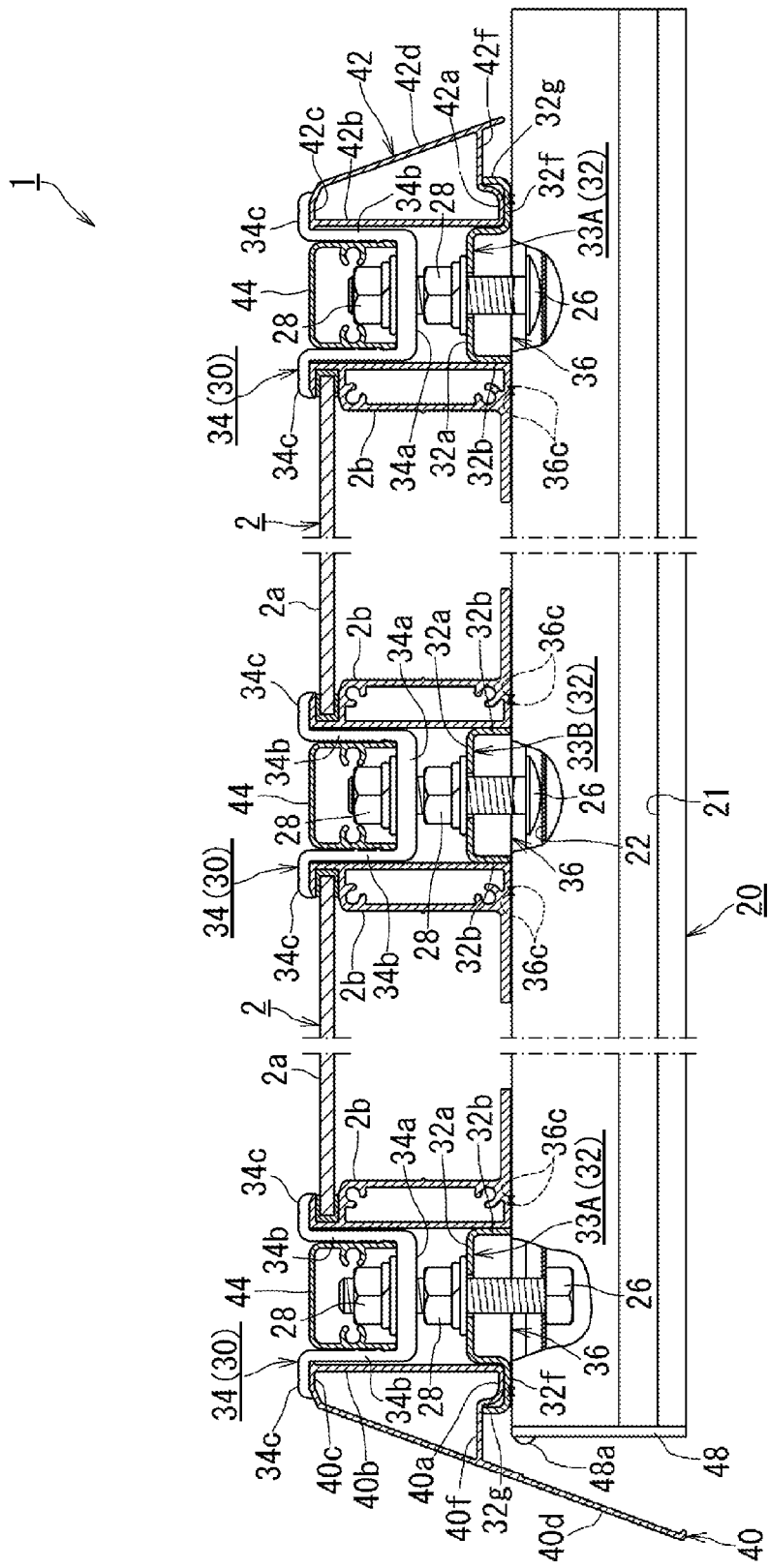
FIG. 4 is a side cross-sectional view illustrating the solar power generation system of FIG. 1.
Figure 5A:
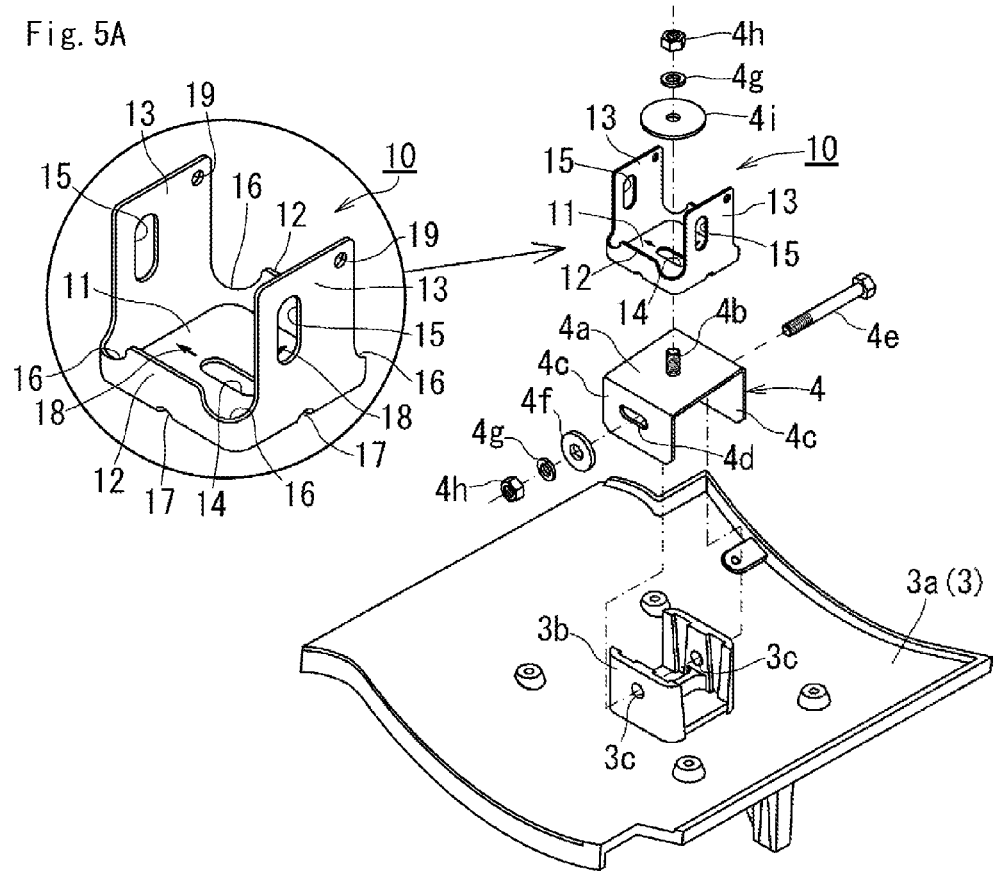
FIG. 5A is an exploded perspective view illustrating mounting of the supporting member on a roof member.
Figure 5B:
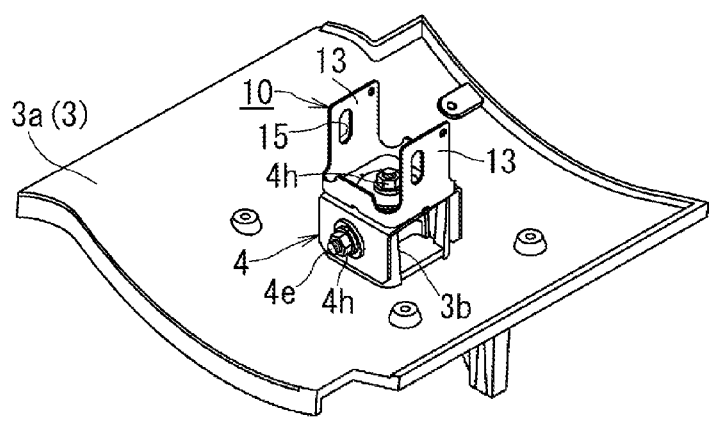
FIG. 5B is a perspective view illustrating a state where the supporting member is mounted on the roof member.
Figure 6:
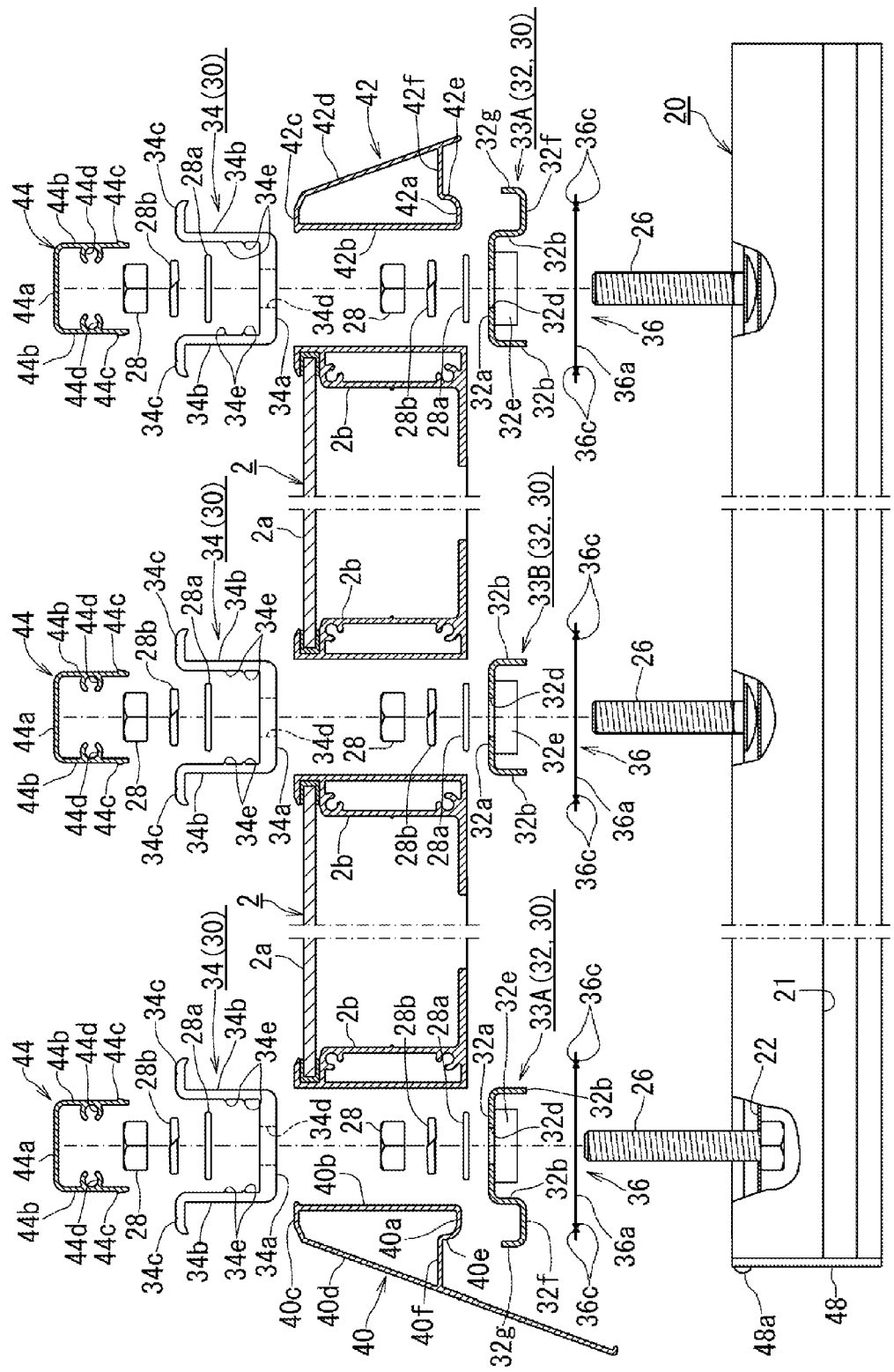
FIG. 6 is an exploded view illustrating the solar power generation system of FIG. 4 in an exploded manner into each of constituent members.
Figures 7A, 7B:
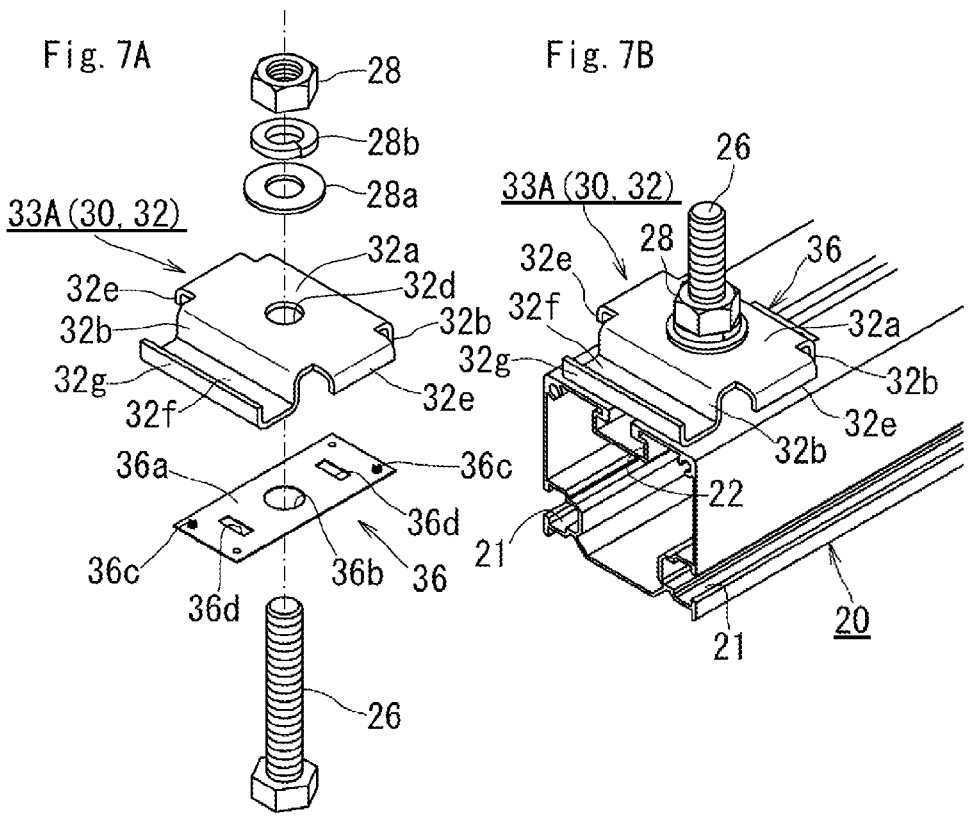
FIG. 7A is a perspective view illustrating an end spacer member mounted on an end at the eaves side in an exploded manner into each of constituent members.
FIG. 7B is a perspective view illustrating a state where the end spacer member is mounted on the end of the crosspiece member at the eaves side.
Figures 8A, 8B:
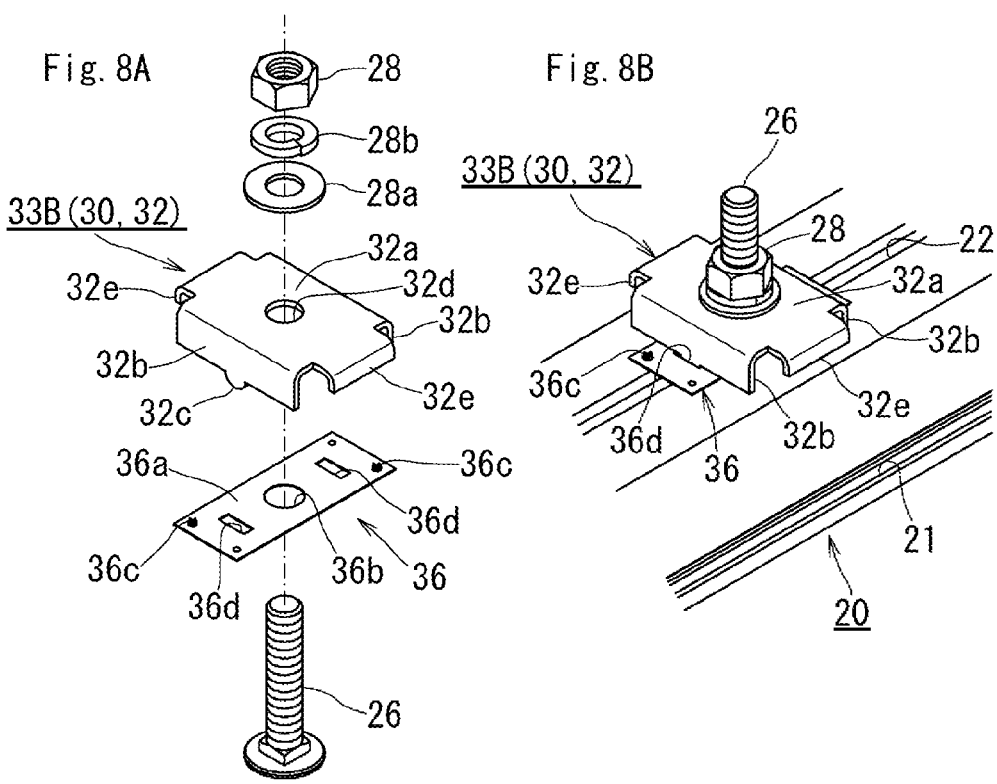
FIG. 8A is a perspective view illustrating an intermediate spacer member mounted on an intermediate Portion in an exploded manner into each of constituent members.
FIG. 8B is a perspective view illustrating a state where the intermediate spacer member is mounted on the crosspiece member.
Figure 9:
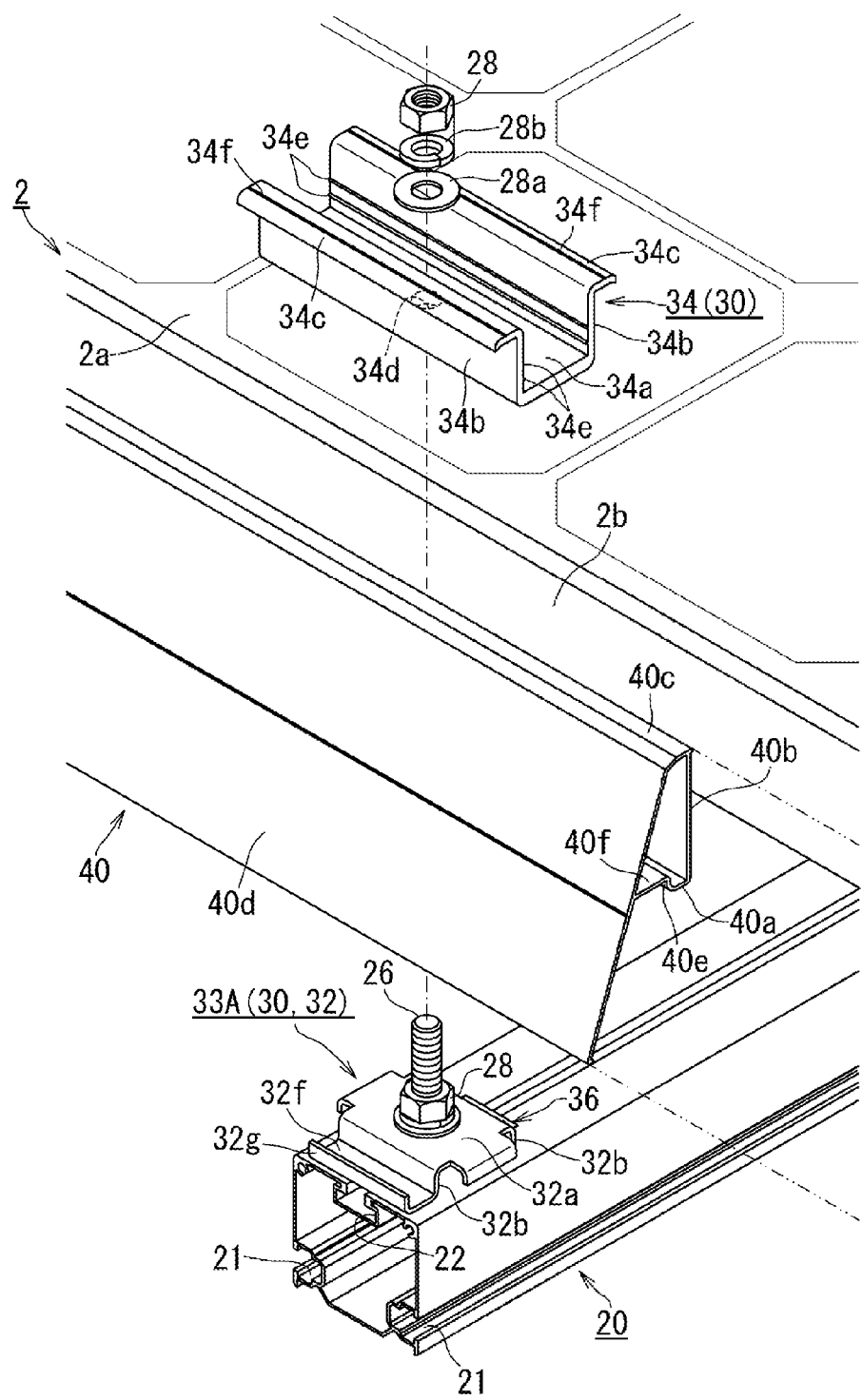
FIG. 9 is an exploded perspective view illustrating mounting of an eaves cover and the solar cell module by a pressing force member.
Figure 10:
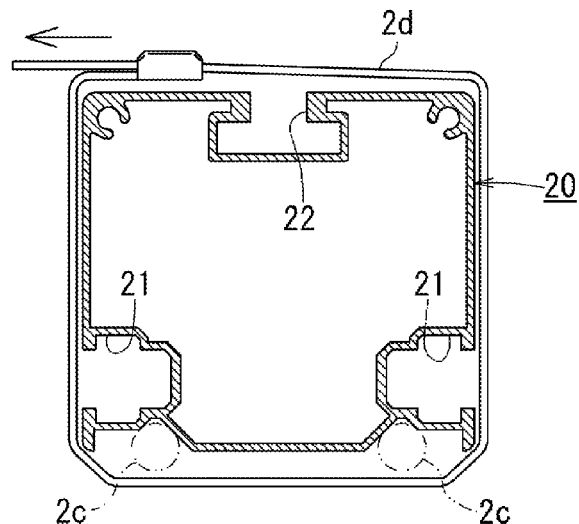
FIG. 10 is a descriptive view illustrating holding of distributing cables by the crosspiece member.

A securing configuration of a solar cell module according to an embodiment of the invention is described in detail with reference to FIG. 1 to FIG. 10. FIG. 1 is an entire perspective view illustrating a solar power generation system in which a securing configuration of a solar cell module according to one embodiment of the invention is applied. FIG. 2 is, an exploded perspective view illustrating the solar power generation system of FIG. 1 in an exploded manner into each of constituent members. FIG. 3A is a cross-sectional view illustrating a mounting state of a supporting member and a crosspiece member. FIG. 3B is a perspective view of FIG. 3A. FIG. 4 is a side cross-sectional view illustrating the solar power generation system of FIG. 1. FIG. 5A is an exploded perspective view illustrating mounting of the supporting member to a roof member. FIG. 5B is a perspective view illustrating a state where the supporting member is mounted on the roof member. FIG. 6 is an exploded view illustrating the solar power generation system of FIG. 4 in an exploded manner into each of constituent members. FIG. 7A is a perspective view illustrating an end spacer member mounted on an end at the eaves side in an exploded manner into each of constituent members. FIG. 7B is a perspective view illustrating a state where the end spacer member is mounted on the end of the crosspiece member at the eaves side. FIG. 8A is a perspective view illustrating an intermediate spacer member mounted on an intermediate portion in an exploded manner into each of constituent members. FIG. 8B is a perspective view illustrating a state where the intermediate spacer member is mounted on the crosspiece member. FIG. 9 is an exploded perspective view illustrating mounting of an eaves cover and the solar cell module by a pressing force member. FIG. 10 is a descriptive view illustrating holding of distributing cables by the crosspiece member.

In the solar power generation system 1 according to the embodiment, a plurality of (two in this example) solar cell modules 2 are installed on inclined roof as illustrated in the drawings. The solar power generation system 1 includes a plurality of supporting members 10, long crosspiece members 20, and securing members 30. The supporting members 10 are mounted on roof members 3 at a predetermined interval in a roof flow direction and a direction (roof lateral direction) perpendicular to the roof flow direction. The crosspiece members 20 are supported by the plurality of supporting members 10 mounted along the roof flow direction. The securing members. 30 secure the solar cell modules 2 installed on the crosspiece members 20 to the crosspiece members 20. Each securing member 30 of the solar power generation system 1 includes a spacer member 32, a pressing force member 34, and an earth member 36. The spacer member 32 can restrict a space between the solar cell modules. The pressing force member 34 is arranged at the upper side of the spacer member 32 and pressurizes the solar cell module 2 to the side of the crosspiece member 20. The earth member 36 electrically connects between the solar cell modules 2 and between the solar cell modules 2 and the crosspiece members 20.

Further, the solar power generation system 1 includes an eaves cover 40, a ridge cover 42, spacing covers 44, end face covers 46, and plate-like crosspiece covers 48. The eaves cover 40 is arranged on an end of the solar power generation system 1 at the eaves side and is secured to the crosspiece members 20 together with the solar cell module 2 by the securing members 30. The ridge cover 42 is arranged on an end of the solar power generation system 1 at the ridge side and is secured to the crosspiece members 20 together with the solar cell module 2 by the securing members 30. The spacing covers 44 cover spaces between the solar cell modules 2, between the eaves cover 40 and the solar cell module 2 and between the ridge cover 42 and the solar cell module 2 at the upper face side. The spacing covers 44 are engaged with and held by the pressing force members 34 of the securing members 30. The end face covers 46 are secured to both ends of the spacing covers 44 in the lengthwise direction and cover spaces between the solar cell modules 2, between the eaves cover 40 and the solar cell module 2 and between the ridge cover 42 and the solar cell module 2 at the side face side. The crosspiece covers 48 close end faces of the crosspiece members 20.

Each solar cell module 2 in the solar power generation system 1 in this example includes a plate-like solar cell panel 2a and a long frame body 2b. The solar cell panel 2a has a plurality of solar cells and an outer shape of the solar cell panel 2a is rectangular. The frame body 2b supports outer peripheries of the solar cell panels 2a. Each solar cell module 2 has a rectangular shape of which long sides are approximately twice the length of short sides when seen from above. It is to be noted that although not illustrated in the drawings in detail, distributing cables 2c which output generated electricity are connected to a back face of the solar cell panel 2a.

Further, in this example, common roof tiles are applied as the roof members 3. Supporting roof members 3a as supporting roof tiles for mounting and supporting the supporting members 10 are arranged in a predetermined pattern on the plurality of roof members 3 which are arranged in a grid form. Each supporting roof member 3a includes bulging portions 3b projecting to the upper side from a substantially center portion thereof. Each supporting member 10 is mounted on and supported by the bulging portions 3b through a base member 4 (see, FIGS. 5A and 5B).

Each base member 4 in this example includes a plate-form top board portion 4a, a securing shaft portion 4b, plate-form side plate portions 4c and long holes 4d. The securing shaft portion 4b is erected to the upper side from a substantially center portion of the top board portion 4a and an external thread is formed on an outer circumference of the securing shaft portion 4b. The side plate portions 4c drop to the lower side from two sides of the top board portion 4a, which are opposed to each other. The long holes 4d penetrate through the side plate portions 4c and extend in the lateral direction. The side plate portions 4c of the base member 4 have dropping lengths which are different from each other and positions of the long holes 4d from the top board portion 4a are also different from each other. The top board portion 4a can be mounted on the bulging portions 3b of the supporting roof member 3a only in the direction that the top board portion 4a is substantially parallel with an inclination of roof such as a roof board 5 which supports the roof members 3 (see, FIG. 11). The base member 4 is arranged such that the longer side plate portion 4c is opposed to a side face of the bulging portion 3b at the ridge side and the shorter side plate portion 4c is opposed to a side face of the bulging portion 3b at the eaves side. Then, a bolt 4e having a predetermined length is made to penetrate through the long holes 4d and the securing holes 3c of the bulging portions 3b from the ridge side. Further, a large flat washer 4f and a spring washer 4g are mounted on a front end of the bolt 4e projecting from the side plate portion 4c at the eaves side, and then, a nut 4h is threadably mounted on the bolt 4e. With this, the base member 4 is secured to the bulging portions 3b (supporting roof member 3a). It is to be noted that the base member 4 is formed by bending a metal plate material such as a stainless.

As illustrated in FIGS. 5A and 5B and the like each supporting member 10 in this example includes a plate-like bottom portion 11 having a substantially rectangular shape, a pair of installing pieces 12, a pair of plate-like supporting pieces 13, a long securing hole 14, and long supporting holes 15. The bottom portion 11 is installed on the base member 4. The pair of installing pieces 12 extend to the upper side from two sides of the bottom portion 11, which are opposed to each other. The pair of supporting pieces 13 extend to the upper side from two sides of the bottom portion 11 which are substantially perpendicular to the two sides from which the installing pieces 12 extend in a state where side faces thereof are coupled to the installing pieces 12. The pair of supporting pieces 13 project to be higher than the installing pieces 12. The securing hole 14 extends in the direction that the pair of supporting pieces 13 are opposed to each other and is formed so as to penetrate through the bottom portion 11. The securing shaft portion 4b of the base member 4 can be inserted through the securing hole 14. The supporting holes 15 are arranged at positions higher than the installing pieces 12 so as to, extend in the vertical direction. The supporting holes 15 are formed so as to penetrate through the supporting pieces 13, respectively. A space between the pair of supporting pieces 13 on the supporting member 10 is set to be such space that the crosspiece member 20 can be inserted therebetween.

Further, each supporting member 10 includes notch portions 16 at portions (four corners) at which side faces of the installing pieces 12 and the supporting pieces 13 are connected to each other. The notch portions 16 are portions which are notched to be lower than the installing pieces 12. The distributing cables 2c guided by guiding grooves 23 on a lower face of the crosspiece member 20, which will be described later, can be prevented from making contact with the supporting member 10 by the notch portions 16. Further, each supporting member 10 is formed such that widths of the installing pieces 12 and the supporting pieces 13 extending to the upper side with respect to the notch portions 16 are shorter than lengths (widths) of corresponding sides of the bottom portion 11, as illustrated in the drawings.

Further, each supporting member 10 includes openings 17 and arrow-like marking portions 18. The openings 17 are provided at boundaries between the installing piece 12 and the bottom portion 11 and between the supporting piece 13 and the bottom portion 11. The installing piece 12 and the supporting piece 13 on which the openings 17 are provided are perpendicular to each other. The openings 17 penetrate through each of the installing piece 12 and the supporting piece 13. The marking portions 18 are formed on an upper face of the bottom portion 11 at the side opposite to the openings 17 with respect to the securing hole 14 so as to point toward the installing piece 12 and the holding piece 13 at the near side. The supporting member 10 is mounted such that arrows of the marking portions 18 point toward the ridge side of the inclined roof. With this, either of the openings 17 inevitably faces to the eaves side so that rainwater and the like which have entered the supporting member 10 can be excreted from the opening 17 to the outside.

Further, each supporting member 10 includes engaging holes 19 which penetrate through the supporting pieces 13 at predetermined positions. If a predetermined engaging screw is screwed into the crosspiece member 20 inserted between the supporting pieces 13 through the engaging holes 19, the supporting member 10 and the crosspiece member 20 can be engaged with each other so as not to relatively move in the lengthwise direction and the vertical direction of the crosspiece member 20. It is to be noted that the supporting member 10 in this example is shaped by plastically deforming a plate, such as a plated steel plate having high corrosion resistance and a stainless steel, having a predetermined thickness with a pressing processing.

Each crosspiece member 20 in this example is formed to be long such that the cross sectional shapes thereof are the same at any places and an outer shape of the crosspiece member 20 is the substantially rectangular, as illustrated in FIGS. 3A and 3B and the like. Each crosspiece member 20 includes first holding portions 21, a second holding portion 22 and two guiding grooves 23. The first holding portions 21 are opened on both side faces of the crosspiece member 20 and are grooves having substantially cross shapes. The second holding portion 22 is opened on an upper face of the crosspiece member 20 and is a groove having an inverted T shape. The guiding grooves 23 are recessed to the upper side from the lower face of the crosspiece member 20 so as to be formed into inverted V shapes in the vicinity of both ends of the lower face. The first holding portions 21 on the crosspiece member 20 can hold first fastener members 25 in a hexagonal nut form in grooves in the vertical direction in the grooves having substantially cross shapes. At this time, the first holding portions 21 can hold the first fastener members 25 such that the first fastener members 25 are not rotatable and are slidable in the lengthwise direction of the crosspiece member 20. It is to be noted that the first fastener members 25 include operating portions 25a having substantially L shapes of which front ends project from the side faces of the crosspiece member 20 in a state of being held by the first holding portions 21. The first fastener members 25 held by the first holding portions 21 can be easily made to slide from the outside of the crosspiece member 20 by operating the operating portions 25a. Further, the second holding portion 22 can hold head portions of the second fastener members 26 such as carriage bolts in the groove having the inverted T shape in a state where external thread portions of the second fastener members 26 project from the upper face of the second holding portion 22. At this time, the second holding portion 22 can hold the head portions of the second fastener members 26 such that the head portions of the second fastener members 26 are not rotatable and are slidable in the lengthwise direction of the crosspiece member 20.

On each crosspiece member 20, the first holding portions 21 on both side faces are arranged at the lower side with respect to a center of the crosspiece member 20 in the vertical direction in the vicinity of lower ends thereof and the second holding portion 22 on the upper face is arranged at a substantially center portion of the crosspiece member 20 in the lateral direction. Further, the distributing cables 2c of the solar cell modules 2 are guided along the crosspiece members 20 by the guiding grooves 23 on the lower faces thereof. An upper face of each crosspiece member 20 projects to the upper side with respect to upper ends of the supporting pieces 13 in a state where the crosspiece member 20 is inserted between the pairs of supporting pieces 13 of the supporting members 10 and a lower face of the crosspiece member 20 is made contact with the installing pieces 12. Further, each crosspiece member 20 includes screw retaining portions 24 having substantially C shapes on upper corners thereof at the inner side. It is to be noted that the crosspiece member 20 in this example is formed by an extrusion made of aluminum or the like.

As illustrated in the drawings, the spacer members 32 of the securing members 30 in this example can be distinguished between an end spacer member 33A and an intermediate spacer member 33B. The end spacer member 33A is used for securing between the eaves cover 40 and the solar cell module 2 and between the solar cell module 2 and the ridge cover 42. The intermediate spacer member 33B is used for securing between solar cell modules 2. It is to be noted that hereinafter, description is made while the same reference numerals denote parts having the same configurations on the end spacer member 33A and the intermediate spacer member 33B. As illustrated in FIGS. 7A and 7B, FIGS. 8A and 8B and the like, each spacer member 32 includes a plate-like top board portion 32a, a pair of leg plate portions 32b, projecting portion(s) 32c, an opening 32d, and side plate portions 32e. An outer shape of the top board portion 32a is a substantially rectangular. The pair of leg plate portions 32b drop to the lower side from long sides of the top board portion 32a. The projecting portion(s) 32c project(s) to the lower side from substantially center portion (s) of lower end (s) of the leg plate portion(s) 32b in the lengthwise direction. The opening 32d penetrates through a substantially center portion of the top board portion 32a and the external thread portion of the second fastener member 26 projecting to the upper side from the upper face of the crosspiece member 20 can be inserted through the opening 32d. The side plate portions 32e drop to the lower side from short sides of the top board portion 32a so as to be shorter than the leg plate portions 32b.

Each spacer member 32 is formed such that a length of the top board portion 32a in the long-side direction is made to be substantially the same as a width of the crosspiece member 20 and a height from an upper face of the top board portion 32a to lower ends of the leg plate portions 32b is made to be approximately one third as the height of the solar cell module 2. Further, the projecting portions 32c of the spacer member 32 have such size that the projecting portions 32c can be inserted into the second holding portion 22 from the upper face of the crosspiece member 20. If the projecting portions 32c are inserted into the second holding portion 22, the spacer member 32 can be prevented from rotating about a shaft of the opening 32d on the crosspiece member 20. Further, rigidity of the spacer member 32 is enhanced by the side plate portions 32e. The spacer member 32 is shaped by bending a metal plate material such as aluminum.

Each end spacer member 33A in this example further includes a bottom plate portion 32f and a standing plate portion 32g in addition to the above configuration. The bottom plate portion 32f extends to the outer side from a lower end of one leg plate portion 32b so as to be substantially parallel with the top board portion 32a. The standing plate portion 32g is erected to the upper side from a front end of the bottom plate portion 32f. A bottom portion 40a or 42a of the eaves cover 90 or the ridge cover 42, which will be described later, is installed on the bottom plate portion 32f between the standing plate portion 32g and the leg plate portion 32b of each end spacer member 33A. It is to be noted that the end spacer member 33A does not include the projecting portion 32c on a lower end of the leg plate portion 32b at the side from which the bottom plate portion 32f extends.

Further, as illustrated in FIG. 4 and the like, each pressing force member 34 of each securing member 30 in this example includes a plate-like substrate member 34a, a pair of standing plate portions 34b, contact portions 34c, and an opening 34d. The substrate member 34a has a predetermined thickness and extends in the direction along the crosspiece member 20. The standing plate portions 34b extend to the upper side from both ends of the substrate member 34a. The contact portions 34c extend from upper ends of the standing plate portions 34b in the direction of separating from each other. The contact portions 34c extend so as to be substantially parallel with the substrate member 34a. The opening 34d penetrates through a substantially center portion of the substrate member 34a and the external thread portion of the second fastener member 26 projecting to the upper side from the upper face of the crosspiece member 20 can be inserted through the opening 34d. Lower faces of the contact portions 34c on each pressing force member 34 have shapes that front ends thereof are obliquely lowered so as to be substantially identical to a shape of an upper face of the frame body 2b of the solar cell module 2. Further, a width between outer side faces of the pair of standing plate portions 34b is set to be slightly shorter than a width between outer side faces of the pair of leg plate portions 32b of each spacer member 32.

Further, each pressing force member 34 includes two convex portions 34e which are arranged at upper and lower sides on each of inner side faces of the pair of standing plate portions 34b. Engaging clicks 44c of each spacing cover 44, which will be described later, can be engaged with the convex portions 34e. It is to be noted that each pressing force member 3.4 includes grooves 34f having V shapes on the upper faces of the contact portions 34c and the grooves 34f can be made to serve as hooks when retaining screws. The pressing force member 34 in this example is obtained by cutting a long member having the same cross sectional shape at any places into a predetermined length (length approximately twice the width of the crosspiece member 20) and is formed by an extrusion made of aluminum or the like.

Further, as illustrated in FIGS. 7A and 7B and FIGS. 8A and 8B, each earth member 36 of each securing member 30 in this example includes a main body 36a in a thin plate form, an opening 36b, projecting portions 36c, and insertion holes 36d. The main body 36a has a rectangular shape in which long sides are longer than a length between outer side faces of the pair of leg plate portions 32b on each spacer member 32. The opening 36b penetrates through a substantially center portion of the main body 36a and the external thread portion of the second fastener member 26 projecting to the upper side from the upper face of the crosspiece member 20 can be inserted through the opening 36b. The projecting portions 36c are arranged in the vicinity of four corners of the main body 36a such that one pair of projecting portions 36c on one diagonal line project to the upper side and one pair of projecting portions 36c on the other diagonal line project to the lower side. Front ends of the projecting portions 36c are formed to be sharp. The insertion holes 36d are arranged at both sides with respect to the opening 36b in the lengthwise direction and the projecting portions 32c of each spacer member 32 can be inserted through the insertion holes 36d. The earth member 36 is obtained by shaping a thin plate, such as a stainless steel, having a thickness of 0.1 mm to 1 mm with a pressing processing.

The eaves cover 40 in this example is a long member having the same cross sectional shape at any places. As illustrated in FIG. 4 and the like, the eaves cover 40 includes a bottom portion 40a having a predetermined length, a standing wall portion 40b, a top portion 40c, a side wall portion 40d, an intermediate wall portion 40e, and a connecting portion 40f. The standing wall portion 40b is erected from one end of the bottom portion 40a to the upper side to a substantially same height as the frame body 2b of the solar cell module 2. The top portion 90c extends from an upper end of the standing wall portion 40b in the same direction as the bottom portion 40a so as to have a predetermined width shorter than the bottom portion 40a. The side wall portion 40d extends obliquely downward to the outer and lower sides with respect to the bottom portion 40 from the front end of the top portion 40c. The intermediate wall portion 40e is erected low from the other end of the bottom portion 40a. The connecting portion 40f extends from the upper end of the intermediate wall portion 40e so as to be substantially parallel with the bottom portion 40a and is connected to an inner side of the side wall portion 40d. The eaves cover 40 is formed such that a width between outer side faces of the standing wall portion 40b and the intermediate wall portion 40e is set to be such width that can be fitted into between the standing plate portion 32g and the leg plate portion 32b of each end spacer member 33A. Further, the eaves cover 40 is formed such that a lower end of the side wall portion 40d is located at a height which is substantially the same as the lower faces of the crosspiece members 20 in a state of being secured to the crosspiece members 20 (see, FIG. 4).

Further, the ridge cover 42 in this example is a long member having the same cross sectional shape at any places. The ridge cover 42 includes a bottom portion 42a having a predetermined length, a standing wall portion 42b, a top portion 42c, a side wall portion 42d, an intermediate wall portion 42e, and a connecting portion 42f. The standing wall portion 42b is erected from one end of the bottom portion 42a to the upper side to a substantially same height as the frame body 2b of the solar cell module 2. The top portion 42c extends from an upper end of the standing wall portion 42b in the same direction as the bottom portion 42a so as to have a predetermined width shorter than the bottom portion 42a. The side wall portion 42d extends obliquely downward to the height which is substantially the same height as the bottom portion 42a and to the outer side with respect to the bottom portion 42a from the front end of the top portion 42c. The intermediate wall portion 42e is erected low from the other end of the bottom portion 42a. The connecting portion 42f extends from the upper end of the intermediate wall portion 42e so as to be substantially parallel with the bottom portion 42a and is connected to an inner side of the side wall portion 42d. The ridge cover 42 has substantially the same shape as that of the eaves cover 40 excluding the side wall portion 42d. The ridge cover 42 and the eaves cover 40 are formed by an extrusion made of aluminum or the like.

Further, each spacing cover 44 in this example is a long member having the same cross sectional shape at any places. Each spacing cover 44 includes a plate-like top portion 44a, plate-like side portions 44b, the engaging clicks 44c, and screw retaining portions 44d having substantially C shapes. The top portion 44a has a width which is slightly shorter than a width between inner side faces of the pair of standing plate portions 34b of the pressing force member 34. The side portions 44b drop to the lower side from both ends of the top portion 44a. The engaging clicks 94c project on outer side faces in the vicinity of lower ends of the side portion 44b and are inclined to the inner side toward the lower ends. The screw retaining portions 44d are formed on inner side faces of the side portions 44b. Each spacing cover 44 is fitted into and secured by between the pairs of standing plate portions 34b of the pressing force members 34. Further, a height of an upper face of the top portion 44a is substantially the same as the upper face of the frame body 2b of the solar cell module 2 in a state where the lower ends of the side portion 44b make contact with upper faces of the substrate members 34a of the pressing force members 34. The engaging clicks 44c are engaged with the convex portions 34e of the pressing force members 34 at the lower side in this state. The spacing cover 44 in this example is formed by an extrusion made of aluminum or the like.

Figure 11:
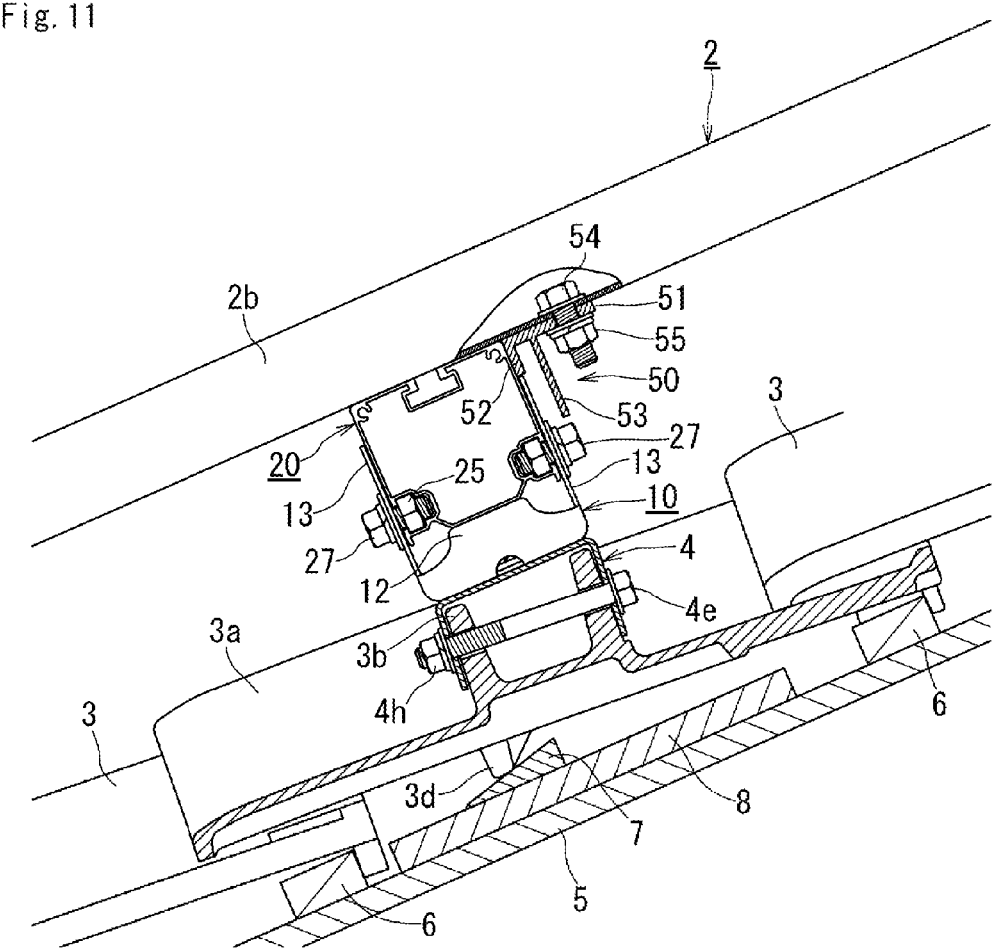
FIG. 11 is a side cross-sectional view illustrating main parts in an example in which the crosspiece member is arranged so as to extend along a roof lateral direction.

Subsequently, a securing configuration of the solar cell modules 2 in the solar power generation system 1 according to the embodiment is described in detail together with a construction method. At first, on the roof on which the solar power generation system 1 is to be installed, supporting roof members 3a for mounting the supporting members 10 are arranged on and secured to the roof at predetermined positions in accordance with the number of the solar cell modules 2 to be installed and an installation pattern. It is to be noted that when the solar power generation system 1 is installed on the existing roof, the roof members 3 at the corresponding positions are replaced by the supporting roof members 3a. As illustrated in FIG. 11, an end of each supporting roof member 3a at the ridge side is installed on and engaged with crosspiece trees 6 which are mounted on the roofboard 5 at a predetermine interval in the flow direction. A leg portion 3d provided on a lower face of the supporting roof member 3a is installed on the roofboard 5 through a wedge member 7 and a reinforced plate 8. With this, a space is formed between the end of the supporting roof member 3a at the eaves side and the roof member 3 at the eaves side so that a load of the supporting roof member 3a is not applied to other roof members 3. It is to be noted that although not illustrated in the drawings in detail, the supporting roof members 3a are secured to the roofboard 5 with predetermined securing screws.

As illustrated in FIGS. 5A and 5B, on each supporting roof member 3a mounted on the roof, the base member 4 is mounted on the bulging portions 3b such that the top board portion 4a of the base member 4 is substantially identical to inclination of the roof (such as the roofboard 5) (see, FIG. 11). Then, the supporting member 10 is installed on the base member 4 such that the securing shaft portion 4b of the base member 4 is made to be inserted through the securing hole 14 of the supporting member 10 from the lower side. Further, at this time, the supporting member 10 is installed on the base member 4 such that the pair of supporting pieces 13 of the supporting member 10 face to the roof lateral direction and the arrow of the marking portion 18 which points toward the installing piece 12 points toward the ridge side of the roof. In this state, the securing shaft portion 4b of the base member 4, which projects to the upper side through the securing hole 19 of the supporting member 10, is inserted through the large flat washer 4f and the spring washer 4g in this order. Then, the nut 4h is threadably mounted on the securing shaft portion 4b and is tightened. With this, each supporting member 10 is secured to each base member 4. It is to be noted that when each supporting member 10 is secured to each base member 4, each supporting member 10 is secured at an appropriate position by sliding the supporting member 10 in the roof lateral direction through the securing hole 14 as the long hole such that the plurality of supporting members 10 arranged along the flow direction are arranged on the same line.

After the supporting members 10 have been mounted on the roof, each crosspiece member 20 is inserted between the supporting pieces 13 of the plurality of supporting members 10 arranged in the flow direction so that the crosspiece member 20 is installed on the installing pieces 12 of the supporting members 10. After the position of the crosspiece member 20 has been determined in the flow direction, on the supporting member 10 at the eaves-most side, a long bolt 27c is inserted from the outer side of the supporting hole 15 on one supporting piece 13 so as to exit from the supporting hole 15 on the other supporting piece 13 while penetrating through the crosspiece member 20. Then, a nut 27d is threadably mounted on a front end of the long bolt 27c which penetrates through the crosspiece member 20 so as to temporarily secure them. With this, the crosspiece member 20 can be prevented from moving to the eaves side. On other supporting members 10, as illustrated in FIG. 3A, the first fastener members 25 are inserted into the first holding portions 21 at both ends, respectively, starting from an end of the crosspiece member 20 at the ridge side. Thereafter, the first fastener members 25 are made to slide to the positions of the supporting holes 15 of the supporting members 10 by operating the operating portions 25a of the first fasteners members 25. Then, to-be first fastener members 27 formed by hexagonal bolts are threadably mounted on the first fastener members 25 from the outer side through the supporting holes 15 so as to sandwich flat washers 27a and spring washers 27b. With this, each crosspiece member 20 is temporarily secured to the supporting members 10.

Then, after all the crosspiece members 20 have been temporarily secured, the crosspiece members 20 are appropriately slid in the vertical direction in a range of the supporting holes 15 extending in the vertical direction on the supporting members 10 such that upper faces of the crosspiece members 20 are substantially parallel with the roofboard 5 or the like and are arranged on the same plane. Then, the crosspiece members 20 are secured to the supporting members 10 by tightening the to-be first fastener members 27 and the like at appropriate positions. It is to be noted that although not illustrated in the drawings, after the crosspiece members 20 have been secured to the supporting members 10, predetermined engaging screws are screwed into side faces of the crosspiece members 20 through the engaging holes 19 of the supporting members 10. With this, even if the to-be first fastener members 27 and the like are loosened, the crosspiece members 20 can be prevented from sliding.

Further, the crosspiece covers 48 are mounted by screwing the screws 48a into the screw retaining portions 24 of the crosspiece members 20 while sandwiching the crosspiece covers 48 therebetween at ends of the crosspiece members 20 at the eaves side. It is to be noted that in this example, as illustrated in FIG. 4 and the like, the front sides (eaves side) of the ends of the crosspiece members 20 at the eaves side are covered by the side wall portion 40d of the eaves cover 40. Therefore, even if the crosspiece covers 48 are not mounted on the ends of the crosspiece members 20 at the eaves side, appearance thereof is not deteriorated. Further, in this example, the crosspiece cover 48 which is secured to the crosspiece member 20 by using the screws 48a has been described. However, a crosspiece cover having an engaging click which is inserted into and engaged with the crosspiece member 20, the first holding portions 21 or the second holding portion 22 may be employed.

Next, the end spacer member 33A is secured to each crosspiece member 20 in the vicinity of the end thereof at the eaves side. To be more specific, as illustrated in FIG. 4 and the like, when the end spacer member 33A is secured to each crosspiece member 20 at the eaves side, the external thread portion of the second fastener member 26 formed by the hexagonal bolt or the like is inserted through a through-hole which penetrates through the second holding portion 22 from the inner side of the crosspiece member 20 and is extended to the upper side from the upper face of the crosspiece member 20. Then, the external thread portion is made to be inserted through the opening 36b of the earth member 36, the opening 32d of the end spacer member 33A, a flat washer 28a, and a spring washers 28b in this order. Then, a to-be second fastener member 28 formed by a hexagonal nut is threadably mounted on the external thread portion. With this, each spacer member 33A and the like are secured to each crosspiece member 20. Note that when each end spacer member 33A and the like are secured, the end spacer member 33A is arranged such that the bottom plate portion 32f of the end spacer member 33A faces to the eaves side. Then, although not illustrated in the drawings, the end spacer member 33A and the like are secured to the crosspiece member 20 such that the projecting portion 32c of the end spacer member 33A is inserted through the insertion holes 36d of the earth member 36 and the projecting portion 32c is inserted into the second holding portion 22 of the crosspiece member 20.

After the end spacer members 33A and the like have been secured to the ends of the crosspiece members 20 at the eaves side, the bottom portion 40a of the eaves cover 40 is installed on the bottom plate portions 32f of the end spacer members 33A. Further, the solar cell module 2 is installed on the crosspiece members 20 such that long sides of the solar cell module 2 are perpendicular to the crosspiece members 20 at the ridge side with respect to the end spacer members 33A. Further, a side face of the frame body 2b of the solar cell module 2 at the eaves side is made contact with outer side faces of the leg plate portions 32b of the end spacer members 33A at the eaves side. It is to be noted that the solar cell module 2 is installed on the two crosspiece members 20 such that overhangs of the solar cell module 2 at both ends in the roof lateral direction are substantially equivalent to each other.

Further, in this state, the pressing force members 34 are inserted between the eaves cover 40 and the solar cell module 2 such that the external thread portions of the second fastener members 26 projecting to the upper side from the end spacer members 33A penetrate through the openings 34d of the pressing force members 34. In addition, the front ends of the second fastener members 26 projecting from the openings 34d are inserted into the flat washers 28a and the spring washers 28b, and then, the to-be second fastener members 28 are threadably mounted on the front ends of the second fastener members 26. With this, the pressing force members 34 are fastened and secured to the crosspiece members 20. If the pressing force members 34 are fastened and secured in this manner, the lower faces of the contact portions 34c of the pressing force members 34 make contact with the top portion 40c of the eaves cover 40 and the upper face of the frame body 2b of the solar cell module 2 at the eaves side. Further, the eaves cover 40 and the frame body 2b are pressurized to the lower side (crosspiece members 20) by the pressing force members 34. With the pressurizing forces, the projecting portions 36c of the earth members 36 get stuck in each of the upper faces of the crosspiece members 20 and the lower face of the frame body 2b. Therefore, the frame body 2b and the crosspiece members 20 are electrically connected to each other through the earth members 36.

Next, the intermediate spacer members 33B and the like are temporarily assembled in the following manner. That is, the external thread portions of the second fastener member 26 formed by carriage bolts are inserted into the openings 36b of the earth members 36, the openings 32d of the end spacer members 33B, the flat washers 28a, and the spring washers 28b in this order. Then, the to-be second fastener members 28 are threadably mounted on the front ends of the external thread portions. Further, the projecting portions 32c of the end spacer members 33B are inserted through the insertion holes 36d of the earth members 36 so as to temporarily assemble the intermediate spacer members 33B and the like. Thereafter, head portions of the second fastener members 26 of the intermediate spacer members 33B and the like which have been temporarily assembled in this manner are inserted into the second holding portions 22 of the crosspiece members 20 from ends thereof at the ridge side. Further, the head portions of the second fastener members 26 of the intermediate spacer members 33B and the like are slid to the eaves side along the second holding portions 22. Then, the outer side faces of the leg plate portions 32b of the intermediate spacer members 33B at the eaves side are made contact with a side face of the frame body 2b of the solar cell module 2 at the ridge side. Note that the eaves side of the solar cell module 2 has been secured previously. In addition, the projecting portions 32c of the intermediate spacer members 33B are inserted into the second holding portions 22 from the upper face side. It is to be noted that before the solar cell module 2 is installed on the crosspiece members 20, the intermediate spacer members 33B and the like which have been temporarily assembled may be previously held by the second holding portions 22 and slide to positions closer to positions at which the intermediate spacer members 33B and the like are secured.

Further, the intermediate spacer members 33B are secured to the crosspiece members 20 by tightening the to-be second fastener members 28 in a state where the frame body 2b at the ridge side and the intermediate spacer members 33B make contact with each other. It is to be noted that in this state, only the intermediate spacer members 33B are secured and the frame body 2b at the ridge side is not secured. Then, the subsequent (second stage of) solar cell module 2 is installed on the crosspiece members 20 at the ridge side with respect to the intermediate spacer members 33B. At this time, the solar cell module 2 is installed such that ends of the solar cell module 2 in the lateral direction are aligned with the solar cell module 2 at the eaves side and a side face of the frame body 2b at the eaves side makes contact with the outer side faces of the leg plate portions 32b of the intermediate spacer members 33B at the ridge side. Then, the pressing force members 34 are inserted between the solar cell modules 2 such that the external thread portions of the second fastener members 26 projecting from the intermediate spacer members 33B penetrate through the openings 34d of the pressing force members 34 in the same manner as described above. Further, the front ends of the second fastener members 26 projecting, from the openings 34d are inserted into the flat washers 28a and the spring washers 28b, and then, the to-be second fastener members 28 are threadably Mounted on the front ends of the second fastener members 26. With this, the pressing force members 34 are fastened and secured to the crosspiece members 20.

As described above, the frame body 2b at the ridge side and the frame body 2b at the eaves side on the solar cell modules 2 at the eaves side and the ridge side are pressurized and secured to the crosspiece members 20 and the projecting portions 36c of the earth members 36 get stuck in each of the lower faces of the frame bodies 2b of the solar cell modules 2 which are adjacent to each other in the flow direction and the upper faces of the crosspiece member 20. With this, the solar cell modules 2 are electrically connected to each other through the earth members 36.

Next, the external thread portions of the second fastener members 26 formed by carriage bolts are inserted into the earth members 36, the end spacer members 33A, the flat washers 28a, the spring washers 28b, and the to-be second fastener members 28 in this order so as to temporarily assemble the intermediate spacer members 33A and the like. In this case, the end spacer members 33A are used instead of the above intermediate spacer members 33B. Then, the head portions of the second fastener members 26 are inserted into the second holding portions 22 from the ends of the crosspiece members 20 at the ridge side such that the bottom plate portions 32f of the end spacer members 33A of the end spacer members 33A and the like which have been temporarily assembled face to the ridge side. Further, the head portions of the second fastener members 26 are slid to the eaves side. Then, the outer side faces of the leg plate portions 32b of the intermediate spacer members 33A at the eaves side are made contact with a side face of the frame body 2b of the solar cell module 2 at the ridge side. Further, the to-be second fastener members 28 are tightened so that the end spacer members 33A are secured to the crosspiece members 20 in the same manner as described above.

In this state, the bottom portion 42a of the ridge cover 42 is placed on the bottom plate portions 32f of the end spacer members 33A such that the side wall portion 42d faces to the ridge side. Further, the pressing force members 34 are inserted between the solar cell module 2 and the ridge cover 42 such that the external thread portions of the second fastener members 26 projecting to the upper side from the end spacer members 33A penetrate through the openings 34b of the pressing force members 34. Further, the front ends of the second fastener members 26 projecting from the openings 34d are inserted into the flat washers 28a and the spring washers 28b, and then, the to-be second fastener members 28 are threadably mounted on the front ends of the second fastener members 26. With this, the pressing force members 34 are fastened and secured to the crosspiece members 20 so that the frame body 2b of the solar cell module 2 at the ridge side and the ridge cover 42 are secured to the crosspiece members 20. As illustrated in FIG. 10, when the solar cell modules 2 are secured to the crosspiece members 20, the distributing cables 2c which are connected to the solar cell modules 2 are inserted into the guiding grooves 23 on the lower faces of the crosspiece members 20, and then, the distributing cables 2c including the crosspiece members 20 are tightened by predetermined banding bands 2d at a predetermined interval so that the distributing cables 2c are made to be along the crosspiece members 20.

Further, the spacing covers 44 are inserted between the pairs of standing plate portions 34b of the pressing force members 34 secured between the eaves cover 40 and the solar cell module 2, between the solar cell modules 2, and between the ridge cover 42 and the solar cell module 2 starting from the eaves side until the lower ends of the side portions 44b make contact with the upper faces of the substrate members 34a of the pressing force members 34. With this, heights of the upper faces of the spacing covers 44 are substantially the same as heights of the upper faces of the frame bodies 2b of the solar cell modules 2. Therefore, appearance of the solar power generation system 1 can be made better. Further, the engaging clicks 44c of the spacing covers 94 are made into a state of being engaged with the convex portions 34e at the lower side on the pressing force members 34. Therefore, the spacing covers 44 are not easily disengaged from the pressing force members 34. Further, even if the spacing covers 44 are disengaged from the convex portions 34e at the lower side, the spacing covers 44 are engaged with the convex portions 34e at the upper side. In this state, the spacing covers 44 project to the upper side with respect to the frame bodies 2b. Therefore, unusual incident of the spacing covers 44 can be easily noticed so that such unusual incident can be handled before the spacing covers 44 are completely disengaged. Finally, the end face covers 46 are secured by screwing the screws 46a into the screw retaining portions 44d at both ends of the spacing covers 44 through securing holes of the end face covers 46. With this, the solar cell modules 2 are completely installed.

As described above, according to the embodiment, the solar cell modules 2 are secured to the upper faces of the plurality of crosspiece members 20, which are supported on the roof members 3 by the supporting members 10 at a predetermined interval, by the securing members 30. Therefore, a mount is not required to be formed by assembling the crosspiece members 20 in the form of parallel crosses unlike the conventional technique. Accordingly, the number of parts can be reduced so as to reduce the cost and installation man hours can be reduced. Further, the solar cell modules 2 are installed on the plurality of crosspiece members 20 such that long sides of the solar cell modules 2 intersect with the crosspiece members 20 and the solar cell modules 2 are secured to the crosspiece members 20 by the securing members 30 at the intersections. Therefore, if the plurality of crosspiece members 20 are supported on the roof members 3 at an interval shorter than the length of the sides of the solar cell modules 2, which are to be secured, the solar cell modules 2 can be secured. Therefore, the crosspiece members are not required to be mounted at an interval in accordance with the size of the solar cell module unlike the conventional technique. Accordingly, a troublesome work required for mounting the crosspiece members 20 can be simplified so that operation cost can be reduced and a work period can be shortened. Further, the interval at which the crosspiece members 20 are arranged is not required to be set in accordance with the size of the solar cell modules 2. Therefore, even if a laying pitch of the roof members 3 such as roof tiles and the size of the solar cell modules 2 do not correspond to each other, the solar cell modules 2 can be installed on the roof with no problem.

Further, the solar cell modules 2 are arranged such that two sides of the solar cell modules 2, which are opposed to each other, and the crosspiece members 20 are intersected with each other, and the solar cell modules 2 are secured. In addition, the solar cell modules 2 are secured by the securing members 30 through the second fastener members 26 held by the second holding portions 22 of the crosspiece members 20 in a slidable manner. Therefore, the solar cell modules 2 installed on the crosspiece members 20 can be secured regardless of installation positions and sizes of the solar cell modules 2 by sliding the second fastener members 26 (securing members 30). Accordingly, the solar cell modules 2 having various sizes can be employed and the degree of installation freedom of the solar cell modules 2 can be enhanced.

Further, the crosspiece members 20 are inserted between the pairs of supporting pieces 13 on the supporting members 10, and then, the side faces of the crosspiece members 20 and the supporting pieces 13 are fastened and secured through the first fastener members 25 held by the first holding portions 21 of the crosspiece members 20. Therefore, the crosspiece members 20 can be secured tightly from both sides by the supporting members 10. Accordingly, even if a large load is applied to the solar cell modules 2 due to typhoon, strong wind, rainfall, snowfall, or the like, the solar cell modules 2 can be firmly secured. With this, reliability relating to installation of the solar cell modules 2 can be enhanced.

The spacer members 32 as the securing members 30 make contact with the side faces of the solar cell modules 2 so as to restrict the solar cell modules 2 from moving in the direction along the crosspiece members 20. Further, the pressing force members 34 as the securing members 30 make contact with the upper faces of the solar cell modules 2 so as to restrict the solar cell modules 2 from separating from the upper faces of the crosspiece members 20. In addition, the side faces of the solar cell modules 2 make contact with both sides of the spacer members 32 so that the solar cell modules 2 can be easily arranged at a constant interval. Further, if the upper faces of the solar cell modules are pressurized by the pressing force members 34 in this state, the solar cell modules 2 which are adjacent to each other can be secured at the same time. Therefore, the plurality of solar cell modules 2 can be easily arranged and secured at a predetermined interval. Accordingly, a troublesome work relating to the installation of the solar cell modules 2 can be simplified.

Further, if the earth members 36 are interposed between the crosspiece members 20 and the spacer members 32, and then, the solar cell modules 2 which are arranged at both sides with respect to the spacer members 32 are pressurized against the crosspiece members 20 by the pressing force members 34, the projecting portions 36c of the earth members 36 get stuck in each of the lower faces of the solar cell modules 2 and the upper faces of the crosspiece members 20. With this, the solar cell modules 2 and the crosspiece members 20, and the solar cell modules 2 are electrically connected to each other. Therefore, the solar cell modules 2 can be easily earth-connected to each other only by securing the solar cell modules 2 by the securing members 30. Accordingly, a troublesome work relating to the earth connection can be simplified.

Further, the recessed guiding grooves 23 are provided on the lower faces of the crosspiece members 20. Therefore, if the distributing cables 2c are inserted into the guiding grooves 23, the distributing cables 2c can be easily made along the crosspiece members 20 straightly and the distributing cables 2c made along the crosspiece members 20 can be made difficult to move. Accordingly, the distributing cables 2c can be easily attached to the crosspiece members 20 so as to be made along the crosspiece members 20 using the banding bands 2d. Further, the distributing cables 2c can be prevented from being deviated after the attachment. Therefore, the distributing cables 2c can be attached to the crosspiece members 20 with good appearance.

Further, the solar cell modules 2 are secured to the crosspiece members 20 which are arranged so as to extend along the roof flow direction. Therefore, if the securing members 30 (end spacer members 33A) are previously mounted on the crosspiece members 20 in the vicinity of the ends thereof at the eaves side before the solar cell modules 2 are installed on the crosspiece members 20, the solar cell modules 2 on the crosspiece members 20 can be prevented from sliding to the eaves side and dropping by the securing members 30. Accordingly, the solar cell modules 2 are not required to be continuously supported until the solar cell modules 2 are secured by the securing members 30. This makes it possible to easily perform a securing operation of the solar cell modules 2 so as to improve workability and reduce the cost required for the installation.

As described above, the invention has been described by preferred embodiments. However, the invention is not limited to the embodiment and various improvements and changes in design can be made in a range without departing from a scope of the invention, as will be described below.

That is, in the above embodiment, two (two stages of) solar cell modules 2 are arranged in the roof flow direction. However, the invention is not limited thereto and three or more stages of the solar cell modules 2 may be arranged. Note that it is desirable that the lengths of the crosspiece members 20 are set in accordance with the number or the solar cell modules 2 to be arranged and each crosspiece member 20 is supported by two or more supporting members 10. In the above embodiment, one solar cell module 2 is supported by two crosspiece members 20. However, one solar cell module 2 may be supported by three or more crosspiece members 20.

Further, in the above embodiment, the solar cell modules 2 are arranged only in the flow direction. However, the invention is not limited thereto and a plurality of solar cell modules 2 may be also arranged in the roof lateral direction. It is to be noted that when the plurality of solar cell modules 2 are arranged in the lateral direction, it is desirable that a predetermined amount (for example, 2 mm to 5 mm) of space is formed between the solar cell modules 2 in the lateral direction. With this, when the solar cell modules 2 thermally expand due to change in temperature or the like, problems that the solar cell modules 2 are made contact with and pressed against each other and are deformed and securing by the securing members 30 are disengaged can be prevented from occurring. Further, the plurality of solar cell modules 2 may be arranged in a grid form or a zigzag form.

Further, in the above embodiment, the crosspiece members 20 are arranged so as to extend along the roof flow direction. However, the invention is not limited thereto and as illustrated in FIG. 11, the crosspiece members 20 may be arranged so as to extend along the roof lateral direction. With this, the same action effects as those obtained in the above embodiment can be obtained. Further, when the crosspiece members 20 are arranged along the roof lateral direction, it is desirable that an anti-drop member 50 which can make contact with a side face of the crosspiece member 20 is provided on the lower face of the solar cell module 2 arranged at the eaves-most side. It is to be noted that the same reference numerals as those in the above configuration denote the same configurations.

The anti-drop member 50 includes a plate-like securing portion 51, a first contact piece 52, and a second contact piece 53. The securing portion 51 is mounted on the lower face of the solar cell module 2. The first contact piece 52 extends to the lower side from one end side (eaves side) of the securing portion 51. The second contact piece 53 extends to the lower side from between the first contact piece 52 and the securing portion 51 so as to be longer than the first contact piece 52. The anti-drop member 50 is secured to the frame body 2b by a bolt 54 and a nut 55. The anti-drop member 50 has such length that the first contact piece 52 does not hit the supporting piece 13 of the supporting member 10 for supporting the crosspiece member 20 and that the second contact piece 53 does not hit the head portion of the to-be first fastener member 27 for securing the crosspiece member 20 to the supporting member 10. Further, a space between the first contact piece 52 and the second contact piece 53 is set to such space that the head portion (pan head or the like) of a screw which is screwed into the crosspiece member 20 through the supporting piece 13 does not hit the second contact piece 53.

The anti-drop member 50 makes contact with the crosspiece member 20 before the solar cell module 2 is secured to the crosspiece members 20 mounted on the inclined roof members 3 by the securing members 30. Therefore, the anti-drop member 50 makes it possible to prevent the solar cell module 2 from sliding and dropping along the crosspiece member 20. Accordingly, safety during the installing, operation of the solar cell module 2 can be improved and workability can be improved. Further, the anti-drop member 50 includes the first contact piece 52 and the second contact piece 53 which are different in length from each other. Therefore, even if the first contact piece 52 is disengaged from the crosspiece member 20, the second contact piece 53 makes contact with the crosspiece member 20 so as to prevent the solar cell module 2 from dropping from the crosspiece member 20. Accordingly, the safety can be further improved.

Figure 12A:
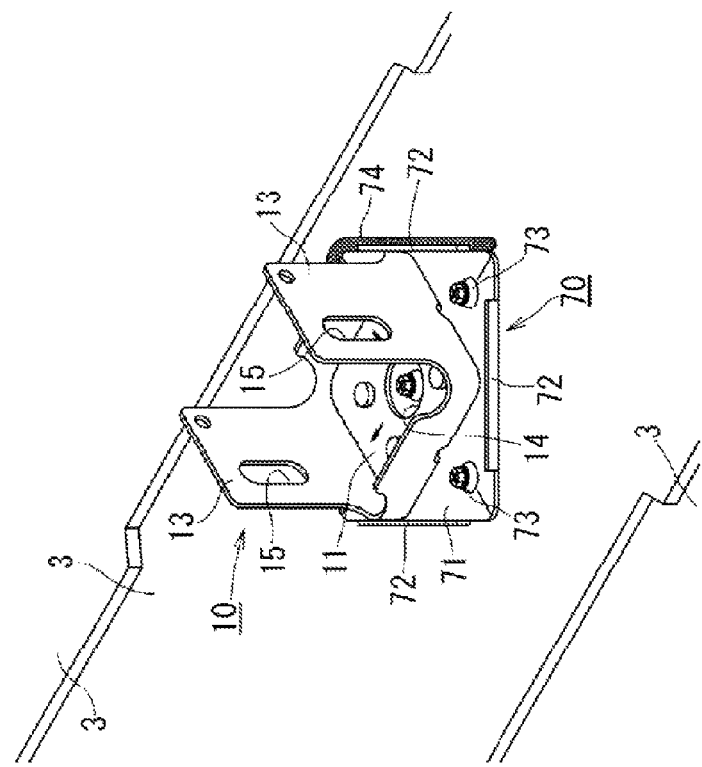
FIG. 12A is a perspective view illustrating an example using a base member in a different form from the example in FIG. 1.

Further, in the above embodiment, the supporting members 10 are secured to the base members 4 mounted on the supporting roof members 3a. However, the invention is not limited thereto. For example, as illustrated in FIG. 12A, each supporting member 10 may be secured to a base member 60 secured onto the roofboard 5. The base member 60 includes a securing portion 61, an extended portion 62, an erected portion 63, an installing portion 64, and a securing shaft portion 65. The securing portion 61 is secured onto the roofboard 5 at the lower side of the roof member 3. The extended portion 62 extends from an end of the securing portion 61 at the eaves side so as to be exposed onto the roof member 3 at the eaves side while passing through between the roof member 3 arranged just above the securing portion 61 and the roof member 3 arranged at the eaves side. The erected portion 63 is erected to the upper side from an end of the extended portion 62 at the eaves side so as to be higher than the roof member 3 arranged just above the securing portion 61. The installing portion 64 extends from an upper end of the erected portion 63 to the ridge side so as to be substantially parallel with the roofboard 5. The securing shaft portion 65 projects to the upper side form the installing portion 64 and can be slid in the roof lateral direction and an external thread portion is formed on an outer circumference of the securing shaft portion 65. On the base member 60, the supporting member 10 can be mounted on the external thread portion of the securing shaft portion 65 as in the case of the base member 4 and the same action effects as those in the above embodiment can be obtained. In addition, the supporting roof members 3a are not required to be separately prepared so as to reduce the cost.

Figure 12B:
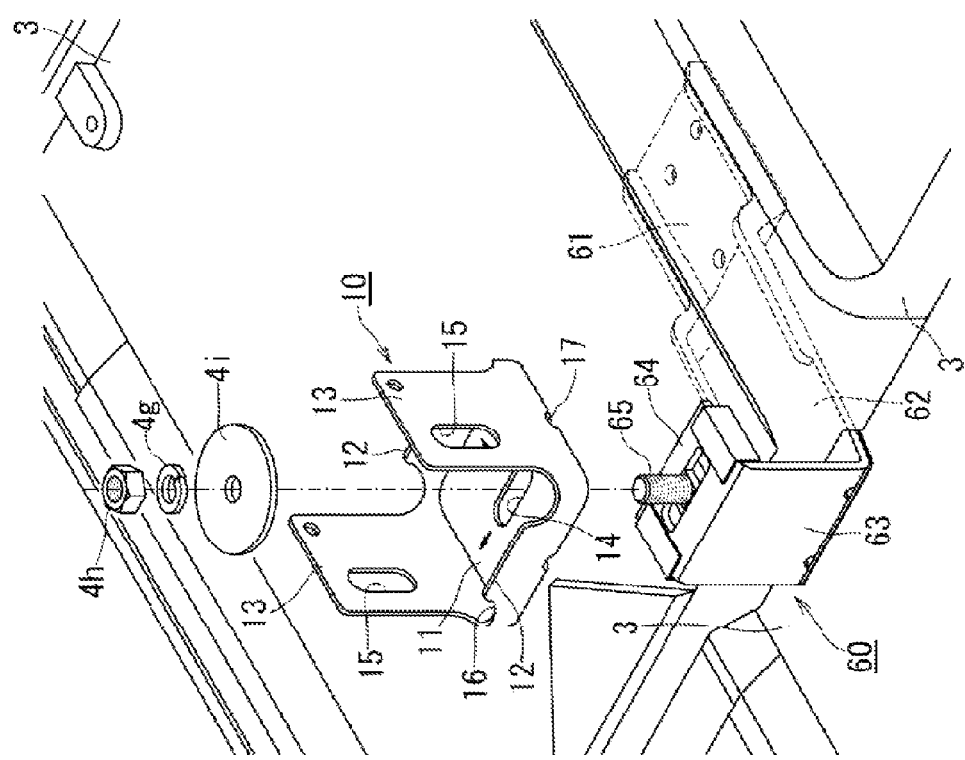
FIG. 12B is a perspective view illustrating an example using a base member in a still different form.

Further, in the above embodiment, a roof tile is applied as the roof member 3 and the base member 4 is secured to the bulging portions 3b of the supporting roof member 3a so that the supporting member 10 is mounted on the roof member 3. However, the invention is not limited thereto. For example, as illustrated in FIG. 12B, a slate may be applied as the roof member 3 and the supporting member 10 may be mounted on the roof member 3 through a base member 70 which is previously mounted on the lower face of the supporting member 10. The base member 70 includes a plate-like substrate member 71 having a substantially square shape when seen from the above, standing portions 72, and securing portions 73. The standing portions 72 are erected to the upper side from four sides of the substrate member 71 by a predetermined amount. The securing portions 73 are arranged at four corners on diagonal lines and an intersection of the diagonal lines and are portions for securing the base member 70 onto the roof member 3. It is to be noted that although not illustrated in the drawing, a waterproof member having a predetermined thickness and made of natural rubber, synthetic rubber, silicon rubber or the like is bonded to a lower face of the base member 70.

The supporting member 10 is located at a position which is rotated relatively with respect to the base member 70 such that diagonal lines are intersected with each other at approximately 45 degree when seen from above. Further, the supporting member 10 is secured in a state of floating from an upper face of the substrate member 71 by a predetermined amount. It is to be noted that on the supporting member 10, the securing hole 14 is a circular hole having a large diameter. The base member 70 including the supporting member 10 can be secured onto the roof member 3 using a predetermined securing screw in a state where the arrows of the marking portions 18 of the supporting member 10 point toward the ridge side so as to correspond to the direction in which the crosspiece members 20 arranged on the roof member 3 extend. With this, the same action effects as those obtained in the above embodiment can be obtained. It is to be noted that as illustrated in the drawing, if the base member 70 is secured onto the roof member 3 such that the arrows of the marking portions 18 of the supporting member 10 point toward the ridge side, one top of the substrate member 71 faces to the ridge side. Further, if predetermined caulking members 74 are attached to two sides of the base member 70, which face to the ridge side, rainwater and the like can be preferably guided to right and left sides and excreted. In addition, rainwater and the like can be prevented from entering the lower side of the base member 70.

Figure 13:
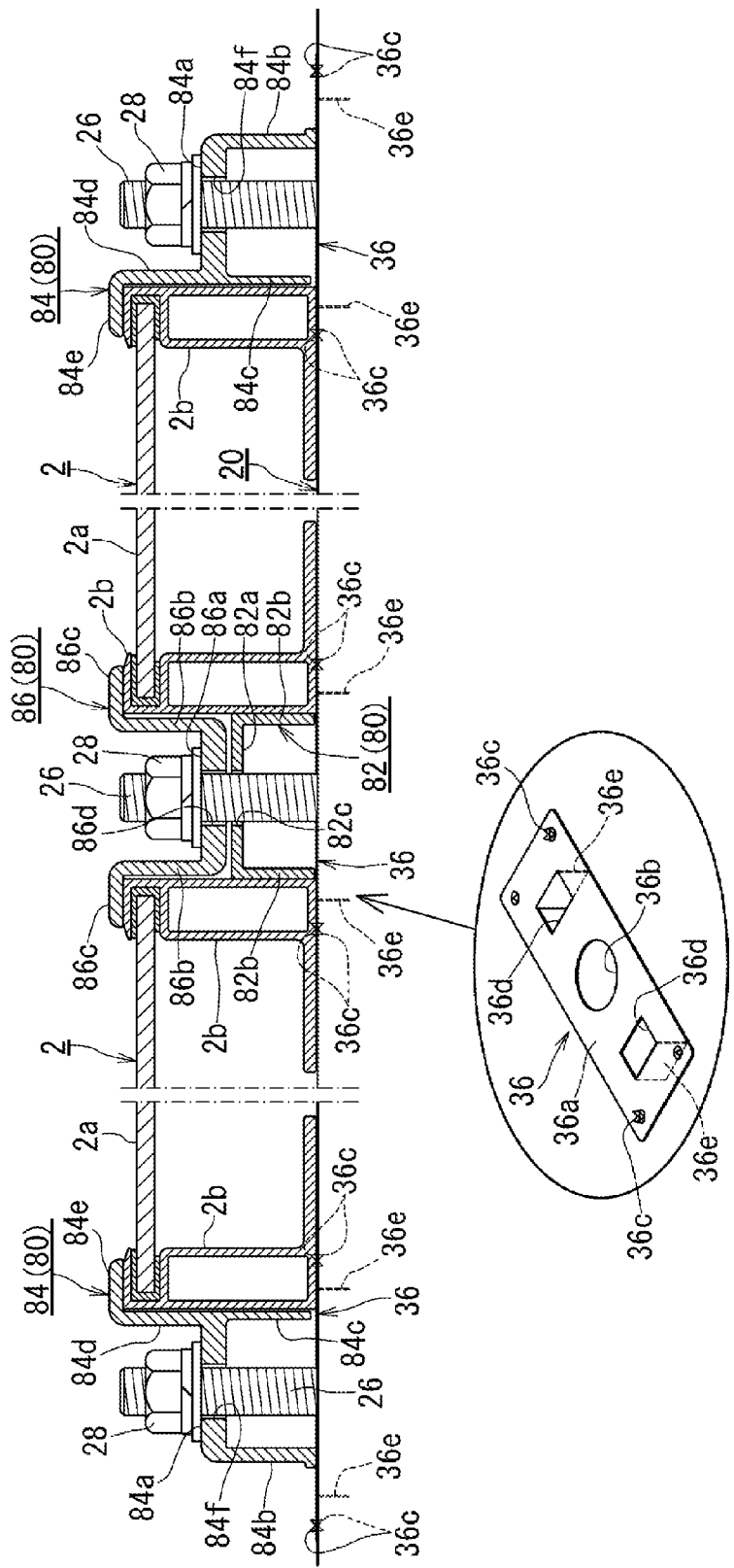
FIG. 13 is a side cross-sectional view illustrating an example using a securing member in a different form from the example in FIG. 1.

Further, in the above embodiment, the spacer members 32 as the securing members 30 are previously secured to the crosspiece members 20 before securing the pressing force members 34. However, the invention is not limited thereto. For example, securing members 80 as illustrated in FIG. 13 may be employed. Each securing member 80 is constituted by an intermediate spacer member 82, end pressing force members 84, and an intermediate pressing force member 86. The intermediate spacer member 82 is arranged between the solar cell modules 2 which are adjacent to each other. The end pressing force members 84 are members for securing the frame bodies 2b of the solar cell modules 2 closer to both ends of each crosspiece member 20 on the solar power generation system 1. The intermediate pressing force member 86 is arranged between the solar cell modules 2. It is to be noted that the same reference numerals as those in the above embodiment denote, the same configurations and description thereof is not repeated.

The intermediate spacer member 82 has a substantially same configuration as the above intermediate spacer member 33B excluding the projecting portions 32c and the side plate portions 32e. The intermediate spacer member 82 includes a plate-like top board portion 82a, a pair of leg plate portions 82b and an opening 82c. An outer shape of the top board portion 82a is substantially rectangular. The pair of leg plate portions 82b drop to the lower side from long sides of the top board portion 82a. The opening 82c penetrates through a substantially center portion of the top board portion 82a and an external thread portion of the second fastener member 26 projecting to the upper side from the upper face of the crosspiece member 20 can be inserted through the opening 82c. A height of the intermediate spacer member 82 is approximately one half as the height of the solar cell module 2.

The end pressing force member 84 in this example includes a plate-like substrate member 84a, a main leg portion 84b, a sub leg portion 84c, a standing plate portion 84d, a contact portion 84e, and an opening 84f. The substrate member 84a extends so as to be substantially parallel with the crosspiece member 20. The main leg portion 84b drops to the lower side from one end of the substrate member 84a. The sub leg portion 84c is slightly shorter than the main leg portion 84b and drops to the lower side from the other end of the substrate member 84a. The standing plate portion 84d is continuous to an outer side face of the sub leg portion 84c and extends to the upper side with respect to the substrate member 84a. The contact portion 84e extends to the opposite side to the substrate member 84a from an upper end of the standing plate portion 84d so as to be substantially parallel with the substrate member 84a. The opening 84f penetrates through a substantially center portion of the substrate member 84a and the external thread portion of the second fastener member 26 projecting to the upper side from the upper face of the crosspiece member 20 can be inserted through the opening 84f. On the end pressing force member 84, a height from a lower end of the main leg portion 84b to a lower face of the contact portion 84e is substantially the same as the height of the frame body 2b of the solar cell module 2.

On the other hand, the pressing force member 86 has substantially the same configuration as that of the above pressing force member 34. The pressing force member 86 includes a substrate member 86a, a pair of standing plate portions 86b, contact portions 86c, and an opening 86d. The substrate member 86a extends so as to be substantially parallel with the crosspiece member 20. The standing plate portions 86b extend to the upper side from both ends of the substrate member 86a. The contact portions 86c extend from upper ends of the standing plate portion 86b in the direction of separating from each other. The contact portions 86c extend so as to be substantially parallel with the substrate member 86a. The opening 86d penetrates through a substantially center portion of the substrate member 86a and an external thread portion of the second fastener member 26 projecting to the upper side from the upper face of the crosspiece member 20 can be inserted through the opening 86d. On the intermediate pressing force member 86, a width between outer side faces of the pair of standing plate portions 86b is set to be slightly shorter than a width between outer side faces of the pair of leg plate portions 82b on the intermediate spacer member 82.

The securing configuration of the solar cell modules 2 using the securing members 80 is as follows. At first, the second fastener members 26 extending from the upper faces of the crosspiece members 20 are inserted through the earth members 36 in the vicinity of one ends of the crosspiece members 20, and then, are inserted through the openings 84f of the end pressing force members 84. Further, the end pressing force members 84 are arranged such that the contact portions 84e face to the centers of the crosspiece members 20 with respect to the openings 84f. Then, the to-be second fastener members 28 are threadably mounted from front ends of the second fastener members 26 so as to temporarily secure them. It is to be noted that each earth member 36 in this example includes dropping pieces 36e at both sides of the opening 36b in the lengthwise direction. The dropping pieces 36e are bent to the lower side at a predetermined width. The dropping pieces 36e are inserted into the second holding portions 22 of the crosspiece members 20 so that the earth members 36 can be prevented from rotating about shafts of the second fastener members 26.

Further, one frame body 2b of the solar cell module 2 is inserted to the lower sides of the contact portions 84e of the end pressing force members 84 in this state and the to-be second fastener members 28 are tightened. With this, one frame body 2b is pressurized against the crosspiece members 20 so that the solar cell module 2 is secured. It is to be noted that at this time, the projecting portions 36c of the earth members 36 get stuck in each of the upper faces of the crosspiece members 20 and the lower face of the solar cell module 2. Therefore, the solar cell module 2 and the crosspiece members 20 are electrically connected to each other. Subsequently, the second fastener members 26 which are held by the second holding portions 22 of the crosspiece members 20 in a slidable manner are inserted through each of the openings 36b of the earth members 36 and the openings 82c of the intermediate spacer members 82. Then, one leg plate portions 82b of the intermediate spacer members 82 are made contact with the side face of the other frame body 2b of the solar cell module 2 to which one frame body 2b has been secured and the frame body 2b of the subsequent solar cell module 2 is made contact with the other leg plate portions 82b of the intermediate spacer members 82.

In this state, the second fastener members 26 projecting from the intermediate spacer members 82 between the solar cell modules 2 are inserted through the openings 86d of the intermediate pressing force members 86, and then, the to-be second fastener members 28 are threadably on the second fastener members 26 and tightened. With this, each of the frame bodies 2b of the solar cell modules 2 which are adjacent to each other are pressurized against the crosspiece members 20 with the intermediate pressing force members 86 so that each of the solar cell modules 2 is secured. At this time, the projecting portions 36c of the earth members 36 also get stuck in each of the upper faces of the crosspiece members 20 and the lower faces of the frame bodies 2b. Therefore, the solar cell modules 2 and the crosspiece members 20 can be electrically connected to each other. Thereafter, the frame body 2b of the solar cell module 2 in the vicinity of the other ends of the crosspiece members 20 is pressurized and secured by the end pressing force members 84. With this, the plurality of solar cell modules 2 are completely secured (installed).

As described above, the same action effects as those obtained in the above embodiment can be obtained with the securing members 80 in this example. In addition, in comparison with the above embodiment, the pressing force members 34 are not required to be secured after the spacer members 32 have been secured to the crosspiece members 20 in this example. It is sufficient that only the end pressing force members 84 and the intermediate pressing force members 86 are secured to the crosspiece members 20. Therefore, a troublesome work required for securing the solar cell modules 2 can be simplified so that cost required for installing the solar cell modules 2 can be reduced.

Further, in the above embodiment, the invention is applied to the solar power generation system 1 which is installed on the roof. However, the invention is not limited thereto and may be applied to a solar, power generation system which is installed on a wall face, a ground, or the like.

Further, in the above embodiment, the crosspiece members 20 are secured to the supporting pieces 13 of the supporting members 10 by fastening the to-be first fastener members 27 to the first fastener members 25 held by the first holding portions 21 though the supporting holes 15. However, the invention is not limited thereto. For example, the crosspiece members 20 may be secured by screwing predetermined engaging screws into the crosspiece members 20 through the engaging holes 19 of the supporting pieces 13 without using the first fastener members 25 and the to-be first fastener members 27.

As described above, according to the invention, a securing configuration of a solar cell module which makes it possible to reduce cost required for installing the solar cell module can be provided.

What is claimed is:

1. A securing configuration of a solar cell module comprising:
    a plurality of supporting members having pairs of plate-like supporting pieces projecting to the upper side, said plurality of supporting members being mounted on roof members at a predetermined interval such that a direction in which the supporting pieces are opposed to each other face to a predetermined direction;
    a plurality of crosspiece members each of which is inserted between the pairs of supporting pieces of the supporting members, said plurality of crosspiece members being supported by the plurality of supporting members, each of said plurality of crosspiece members having at least first holding portions which hold first fastener members in a slidable manner only in a lengthwise direction on both side faces and a second holding portion which holds a second fastener member in a slidable manner only in the lengthwise direction on an upper face, each of said plurality of crosspiece members being secured to and supported by the supporting members by fastening the first fastener members held by the first holding portions to to-be first fastener members penetrating through the supporting pieces of the supporting members, and said plurality of cross-piece members being arranged on roof members at a predetermined interval in a direction perpendicular to the lengthwise direction; and
    securing members which secure the solar cell module to each of the upper faces of the plurality of crosspiece members through the second fastener members held by the second holding portions of the crosspiece members, such that two sides of the solar cell module, which are opposed to each other, intersect the plurality of crosspiece members, wherein the securing members include:
    spacer members which make contact with a side face of the solar cell module, the spacer members are installed on the upper faces of the crosspiece members, the spacer members have openings through which the second fastener members are inserted, and the spacer members have an upside down U shape in cross-sectional view, with the vertical part of the U shape being formed to be lower in height than the solar cell module and contacting the side face of the solar cell module;
    pressing force members which are arranged at an upper side of the spacer members, the pressing force members have openings through which the second fastener members are inserted, and the pressing force members contact portions which are capable of making contact with an upper face of the solar cell module; and
    first and second to-be second fastener members fastened to the second fastener members held by the second holding portions of the crosspiece members through the openings of the spacer portions and the openings of the pressing force members so that the solar cell module is pressurized against the crosspiece members by the pressing force members and secured to the crosspiece members, the first to-be second fastener member being fastened to at least one of the second fastener members and securing at least one of the spacer members to at least one of the crosspiece members, and the second to-be second fastener member being fastened to the same at least one of the second fastener members and securing at least one of the pressing force members to the same at least one of the second fastener members.

2. The securing configuration of the solar cell module according to claim 1, wherein the securing members are arranged between the crosspiece members and the spacer members, the securing members have projecting portions which get stuck in each of a lower face of the solar cell module and the upper faces of the crosspiece members when the solar cell module is pressurized against the crosspiece members by the pressing force members, and the securing members further include earth members which are capable of electrically connecting between solar cell modules arranged at both sides with respect to the spacer members and between the solar cell modules and the crosspiece members.

3. The securing configuration of the solar cell module according to claim 1, wherein the crosspiece members further include guiding grooves which are recessed along the lengthwise direction on lower faces and are capable of guiding distributing cables connected to the solar cell module.

4. The securing configuration of the solar cell module according to claim 1, further including an anti-drop member which is secured to a lower face of the solar cell module and makes contact with the crosspiece member so as to prevent the solar cell module from dropping from the crosspiece member.

5. The securing configuration of the solar cell module according to claim 1, wherein the crosspiece members are arranged so as to extend along a roof flow direction.

* * * * *